United States Patent
Yamagiwa et al.

(10) Patent No.: US 10,460,451 B2
(45) Date of Patent: Oct. 29, 2019

(54) EVALUATION INFORMATION PROVISION SYSTEM AND EVALUATION INFORMATION PROVISION METHOD

(71) Applicants: UNIVERSITY OF TSUKUBA, Tsukuba-shi, Ibaraki (JP); OSAKA UNIVERSITY, Suita-shi, Osaka (JP); MIZUNO CORPORATION, Osaka-shi, Osaka (JP)

(72) Inventors: Shinichi Yamagiwa, Tsukuba (JP); Yoshinobu Kawahara, Suita (JP); Noriyuki Tabuchi, Osaka (JP); Yoshinobu Watanabe, Osaka (JP); Takeshi Naruo, Osaka (JP); Yuichi Shimizu, Osaka (JP); Shohei Shibata, Osaka (JP)

(73) Assignees: UNIVERSITY OF TSUKUBA, Ibaraki (JP); OSAKA UNIVERSITY, Osaka (JP); MIZUNO CORPORATION, Osaka (JP)

( * ) Notice: Subject to any disclaimer, the term of this patent is extended or adjusted under 35 U.S.C. 154(b) by 0 days.

(21) Appl. No.: 15/542,382

(22) PCT Filed: Oct. 18, 2016

(86) PCT No.: PCT/JP2016/080827
§ 371 (c)(1),
(2) Date: Jul. 7, 2017

(87) PCT Pub. No.: WO2017/069115
PCT Pub. Date: Apr. 27, 2017

(65) Prior Publication Data
US 2017/0372482 A1    Dec. 28, 2017

(30) Foreign Application Priority Data

Oct. 21, 2015  (JP) ................................ 2015-207449

(51) Int. Cl.
*G06K 9/00* (2006.01)
*G06T 7/20* (2017.01)
*A63B 71/06* (2006.01)

(52) U.S. Cl.
CPC ............ *G06T 7/20* (2013.01); *A63B 71/0619* (2013.01); *G06K 9/00348* (2013.01); *G06K 9/00496* (2013.01); *A63B 2071/065* (2013.01)

(58) Field of Classification Search
CPC .......... A63B 71/0619; A63B 2071/065; G06K 9/00496; G06K 9/00348; G06K 9/00342; G06T 7/20
See application file for complete search history.

(56) References Cited

U.S. PATENT DOCUMENTS 6,056,671 A * 5/2000 Marmer ............... A61B 5/1124
                                                              482/8
9,350,951 B1 * 5/2016 Rowe ................... H04N 5/2621
(Continued)

FOREIGN PATENT DOCUMENTS

JP    2003-216774 A    7/2003
JP    2005-198818 A2   7/2005
(Continued)

OTHER PUBLICATIONS

International Search Report for related International Patent Application No. PCT/JP2016/080827 dated Nov. 22, 2016.
(Continued)

*Primary Examiner* — Brenda C Bernardi
(74) *Attorney, Agent, or Firm* — Troutman Sanders LLP; Daniel Sharpe

(57) ABSTRACT

In an evaluation information provision system, subject's motion data is stored in association with attributes. When an attribute is assigned, the evaluation information provision system selects feature data from a plurality of the subject's motion data associated with the assigned attribute. The evaluation information provision system calculates a score for the assigned attribute, for the user's motion, using a statistical distance between the selected feature data and the user's motion data. The calculated score is displayed, for example, as a screen.

18 Claims, 27 Drawing Sheets

(56) References Cited

U.S. PATENT DOCUMENTS

| | | | |
|---|---|---|---|
| 2006/0166737 A1* | 7/2006 | Bentley | A61B 5/1122 463/30 |
| 2009/0170663 A1* | 7/2009 | Cox | A61B 5/1038 482/8 |
| 2009/0220124 A1* | 9/2009 | Siegel | G06K 9/00342 382/103 |
| 2011/0082394 A1* | 4/2011 | Chiu | A61B 5/1122 600/595 |
| 2012/0172682 A1* | 7/2012 | Linderman | A61B 5/0476 600/301 |
| 2012/0231840 A1* | 9/2012 | Calman | G06K 9/00342 455/556.1 |
| 2013/0096860 A1* | 4/2013 | Yuzawa | G06Q 10/063114 702/92 |
| 2013/0120445 A1 | 5/2013 | Shimomura et al. | |
| 2013/0171601 A1 | 7/2013 | Yuasa et al. | |
| 2014/0047457 A1 | 2/2014 | Nojima | |
| 2014/0135139 A1 | 5/2014 | Shibuya et al. | |
| 2014/0148931 A1 | 5/2014 | Watanabe et al. | |
| 2015/0005910 A1* | 1/2015 | Ishii | G06K 9/00342 700/91 |
| 2015/0325004 A1* | 11/2015 | Utsunomiya | A61B 5/742 382/103 |
| 2016/0332054 A1* | 11/2016 | Smith | G09B 19/0038 |

FOREIGN PATENT DOCUMENTS

| | | |
|---|---|---|
| JP | 2010-119560 A | 6/2010 |
| JP | 2013-103010 A1 | 5/2013 |
| JP | 5314224 B1 | 10/2013 |
| JP | 2014-97104 A | 5/2014 |
| JP | 2014-131756 A | 7/2017 |
| WO | 2012/039467 A1 | 3/2012 |
| WO | 2013/129606 A1 | 9/2013 |
| WO | 20140194337 A | 12/2014 |

OTHER PUBLICATIONS

Kondo, A et al. "Motion analysis and joint angle measurement of skier gliding on the actual snow field using inertial sensors." Procedia Engineering, vol. 60, 2013, pp. 307-312 [online], [retrieved Jul. 5, 2017], Retrieved from the Internet <URL: http://ac.els-cdn.com/S1877705813011326/1-s2.0-S1877705813011326-main.pdf?_tid=dffac0be-6188-11 e7-a61c-00000aacb35d&acdnat=1499262796_e839a5edeec8e451968e2f1b7fe78794> <DOI: 10.1016j.proeng.2013.07.081>.

Yamagiwa, S et al. "Skill Scoring System for Ski's Parallel Turns." In Proceedings of the 2nd International Congress on Sports Sciences Research and Technology Support, vol. 1, 2014, pp. 121-128 [online], [retrieved Jul. 5, 2017], Retrieved from the Internet <http://www.scitepress.org/DigitalLibrary/Link.aspx?doi=10.5220/0005070001210128> <URL: <DOI: 10.5220/0005070001210128 >.

Watanabe, Y et al. "Evaluation and Quantification of Running Form." Nov. 2013. In Proceedings of the Symposium on Sports and Human Dynamics 2013, the Japan Society of Mechanical Engineers.

Yoneyama, T et al. "Timing of Force Application and Joint Angles During a Long Ski Turn." In: Moriz, E. et al., The Engineering of Sport 6, vol. 1, (Springer, New York, Jan. 2006), pp. 293-298. ISBN: 978-0-387-31773-1. DOI: 10.1007/978-0-387-46050-5_52.

European Search Report dated Apr. 16, 2019 in counterpart European Patent Application 16857429.1.

* cited by examiner

FIG.9

DISTANCE MATRIX

|      | d(1) | d(2) | d(3) | d(4) | d(5) |
|------|------|------|------|------|------|
| d(1) | 0    | 0.2  | 0.1  | 0.08 | 0.2  |
| d(2) | 0.2  | 0    | 0.5  | 0.2  | 0.1  |
| d(3) | 0.1  | 0.5  | 0    | 0.4  | 0.2  |
| d(4) | 0.08 | 0.2  | 0.4  | 0    | 0.1  |
| d(5) | 0.2  | 0.1  | 0.2  | 0.1  | 0    |

|      | d(1) | d(2) | d(3) | d(4) | d(5) | MEAN VALUE |
|------|------|------|------|------|------|------------|
| d(1) | 0    | 0.15 | 0.1  | 0.08 | 0.25 | 0.116      |
| d(2) | 0.15 | 0    | 0.5  | 0.2  | 0.1  | 0.190      |
| d(3) | 0.1  | 0.5  | 0    | 0.4  | 0.2  | 0.240      |
| d(4) | 0.08 | 0.2  | 0.4  | 0    | 0.1  | 0.156      |
| d(5) | 0.25 | 0.1  | 0.2  | 0.1  | 0    | 0.130      |

← FEATURE DATA

M2

|      | d(1) | d(2) | d(3) | d(4) | d(5) | d(X) |
|------|------|------|------|------|------|------|
| d(1) | 0    | 0.15 | 0.1  | 0.08 | 0.25 | 0.09 |
| d(2) | 0.15 | 0    | 0.5  | 0.2  | 0.1  | 0.12 |
| d(3) | 0.1  | 0.5  | 0    | 0.4  | 0.2  | 0.2  |
| d(4) | 0.08 | 0.2  | 0.4  | 0    | 0.1  | 0.1  |
| d(5) | 0.25 | 0.1  | 0.2  | 0.1  | 0    | 0.15 |
| d(X) | 0.09 | 0.12 | 0.2  | 0.1  | 0.15 | 0    |

M3

|      | d(1) | d(2) | d(3) | d(4) | d(5) | d(X) |
|------|------|------|------|------|------|------|
| d(1) | 0    | 0.15 | 0.1  | 0.08 | 0.25 | 0.09 |
| d(2) | 0.15 | 0    | 0.5  | 0.2  | 0.1  | 0.12 |
| d(3) | 0.1  | 0.5  | 0    | 0.4  | 0.2  | 0.2  |
| d(4) | 0.08 | 0.2  | 0.4  | 0    | 0.1  | 0.1  |
| d(5) | 0.25 | 0.1  | 0.2  | 0.1  | 0    | 0.15 |
| d(X) | 0.09 | 0.12 | 0.2  | 0.1  | 0.15 | 0    |

| | DISTANCE | RANK |
|---|---|---|
| d(4) | 0.08 | FIRST PLACE |
| d(X) | 0.09 | SECOND PLACE |
| d(3) | 0.1 | THIRD PLACE |
| d(2) | 0.15 | FOURTH PLACE |
| d(5) | 0.25 | FIFTH PLACE |

T01

FIG.16
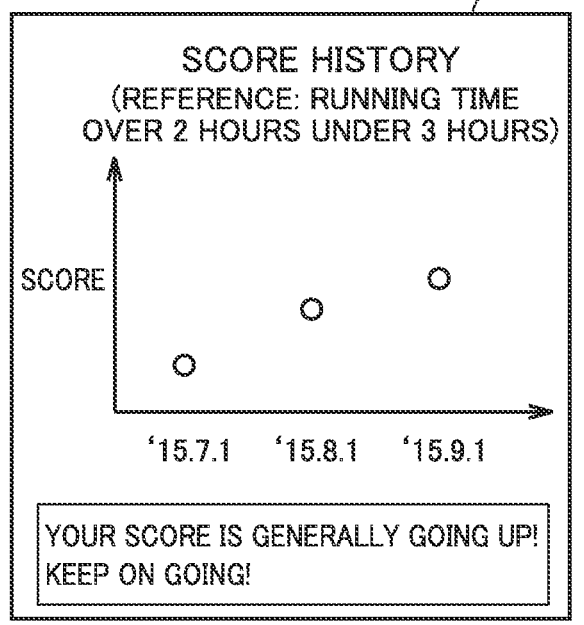
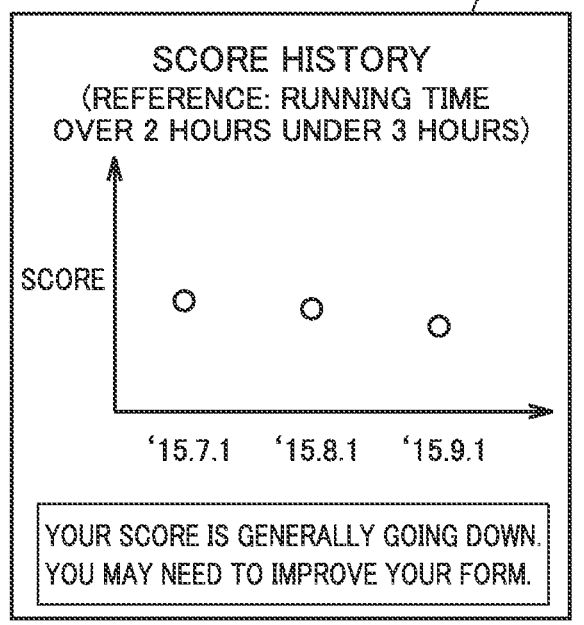

EVALUATION INFORMATION PROVISION SYSTEM AND EVALUATION INFORMATION PROVISION METHOD

CROSS-REFERENCE TO RELATED APPLICATIONS

This application is a U.S. National Stage of International Patent Application No. PCT/JP2016/080827, filed Oct. 18, 2016, which claims the benefit of Japanese Patent Application No. 2015-207449, filed Oct. 21, 2015, both herein fully incorporated by reference.

TECHNICAL FIELD

The present disclosure relates to an evaluation information provision system and an evaluation information provision method, and specifically to an evaluation information provision system and an evaluation information provision method that generate information for evaluating a user's motion using two or more sets of motion data stored in a storage device and user's motion data.

BACKGROUND ART

Conventionally, there is a known technique that creates a motion model by analyzing motion data representing respective physical motions of a plurality of persons. For example, NPD 1, NPD 2, and NPD 3 disclose modeling of a motion for a ski robot. PTD 1 and NPD 4 disclose modeling of a motion for running. PTD 2 discloses modeling of a motion for a golf swing. PTD 3 and PTD 4 disclose a process using a score determined by using a motion model.

PRIOR ART DOCUMENTS

Patent Documents

PTD 1: Japanese Patent No. 5314224
PTD 2: Japanese Patent Laying-Open No. 2014-97104
PTD 3: Japanese Patent Laying-Open No. 2010-119560
PTD 4: Japanese Patent Laying-Open No. 2003-216774

Non-Patent Documents

NPD 1: Yoneyama, T., Scott, N., and Kagawa, H., "Timing of force application and joint angles during a long ski turn", [online], issued in 2006, [searched on Apr. 3, 2015], The Engineering of Sport 6, pages 293-298. Springer, N.Y., <URL:http://link.springer.com/chapter/10.1007%2F978-0-387-46050-5_52#page-1>

NPD 2: Kondo, A., Doki, H., and Hirose, K, "Motion analysis and joint angle measurement of skier gliding on the actual snow field using inertial sensors", [online], issued in 2013, [searched on Apr. 3, 2015], Procedia Engineering, 60 pages 307-312, <URL:http://ac.els-cdn.com/S1877705813011326/1-s2.0-S1877705813011326-main.pdf?_tid=256f2e7e-56e0-11e5-a103-00000aab0f01&acdnat=1441795820_726f173706bce887290572622f0d358f>

NPD 3: Shinichi Yamagiwa, Hiroyuki Ohshima and Kazuki Shirakawa, "Skill Scoring System for Ski's Parallel Turn, issued in 2014, [searched on Apr. 3, 2015], In Proceedings of International Congress on Sport Sciences Research and Technology Support (icSPORTS 2014), pp. 121-128, SCITEPRESS, October 2014

NPD 4: Yoshinobu Watanabe, and other five, Evaluation and Quantification of Running Form, symposium, November 2013, [searched on Apr. 3, 2015], Sports and Human Dynamics 2013, symposium papers, the Japan Society of Mechanical Engineers

SUMMARY OF INVENTION

Technical Problem

However, the models for motions proposed by conventional techniques were used uniformly for the motion analysis. It therefore may not be said that conventional techniques have been able to evaluate a user's motion with various references.

The present disclosure is conceived in the aspect of such a situation, and an objective of the present disclosure is that an evaluation information provision system allows a user to evaluate the user's motion with various references against the user's motion.

Solution to Problem

According to an aspect of the present disclosure, an evaluation information provision system is provided for outputting information evaluating a motion of a user, using two or more sets of motion data of a subject stored in association with an attribute and motion data of the user. The evaluation information provision system includes: a first calculation unit configured to calculate a statistical distance between two or more sets of motion data and the motion data of the user; an acquisition unit configured to acquire assignment of an attribute; a second calculation unit configured to calculate a score of the user for the assigned attribute; and an output unit configured to output the score of the user calculated by the second calculation unit. The second calculation unit is configured to select feature data representing a feature of the attribute acquired by the acquisition unit, based on the statistical distance calculated by the first calculation unit for motion data associated with the attribute acquired by the acquisition unit among the two or more sets of motion data, and to calculate the score of the user for the attribute acquired by the acquisition unit, using a statistical distance between the motion data associated with the attribute acquired by the acquisition unit and the feature data, and a statistical distance between the motion data of the user and the feature data.

Motion data may represent each of motions of one or more parts of a subject or a user.

Motion data may represent each of motions of one or more parts in a tool operated by a subject or a user.

The acquisition unit may accept input of assignment of an attribute.

The attribute may include a classification for superiority/inferiority of a motion.

The classification may be a diversity of marathon running times.

The attribute may include a classification for a property other than superiority/inferiority of a motion.

The classification may distinguish a person who makes a motion.

The classification may distinguish a tool used in a motion.

The second calculation unit may be configured to select motion data having a smallest mean value of statistical distances from other motion data, as the feature data, from among motion data associated with the attribute acquired by the acquisition unit.

The second calculation unit may be configured to set an order for the statistical distance from the feature data, in the motion data of the user and the motion data associated with the attribute acquired by the acquisition unit, and to calculate the score of the user based on the order in the user's motion data.

The second calculation unit may be configured to calculate the score of the user for each of the motion data of the user at a plurality of timings, and the output unit may be configured to output the score of the user for each of the plurality of timings.

The output unit may further output information evaluating whether a change of scores at the plurality of timings rises or falls over time.

The acquisition unit may acquire assignment of different kinds of attributes.

The acquisition unit may be configured to acquire assignment of an attribute of a first kind and an attribute of a second kind. The attribute of the second kind may include two or more kinds of attributes. The second calculation unit may be configured to acquire feature data that is motion data representing a feature of the attribute of the first kind, for each kind of the attributes of the second kind. The second calculation unit may calculate the score of the user for the attribute of the first kind, for each kind of the attributes of the second kind. The output unit may be configured to output the score of the user for the attribute of the first kind, for each kind of the attributes of the second kind.

The output unit may be configured to compare the scores for different kinds of the attributes of the second kind to output information evaluating the degree of relevancy to the attribute of the first kind in two or more kinds of attributes of the second kind.

The output unit may be further configured to output a statistical distance calculated by the first calculation unit for motion data associated with an attribute to be compared with the attribute of the first kind, in a manner that identifies each of the attribute of the first kind and the attribute to be compared.

According to another aspect of the present disclosure, an evaluation information provision method is provided to output information evaluating a motion of a user, using two or more sets of motion data of a subject stored in association with an attribute and motion data of the user. The evaluation information provision method includes the steps of: calculating a statistical distance between the two or more sets of motion data and the motion data of the user; acquiring assignment of an attribute; selecting feature data representing a feature of the acquired attribute from a plurality of motion data of the acquired attribute, based on a statistical distance calculated for motion data associated with the acquired attribute among the two or more sets of motion data, and calculating a score of the user for the acquired attribute, using a statistical distance between motion data associated with the acquired attribute and the feature data and a statistical distance between the motion data of the user and the feature data; and outputting the calculated score of the user.

Advantageous Effects of Invention

According to an aspect of the present disclosure, the evaluation information provision system selects feature data from a plurality of motion data associated with an attribute, based on the statistical distance for motion data associated with the attribute, and then calculates a score of the user for the assigned attribute using the selected feature data and the user's motion data.

With this configuration, the feature data to be selected changes according to which kind of motion data is stored as the subject's motion data, and the calculated score changes accordingly. Therefore, the evaluation information provision system evaluates the user's motion with various references.

BRIEF DESCRIPTION OF DRAWINGS

FIG. 9 is a diagram schematically showing a manner in which the calculated distance between motion data is stored.

FIG. 11 is a diagram for explaining a method of calculating a user's score.

FIG. 12 is a diagram for explaining a method of calculating a user's score.

FIG. 16 is a diagram showing two screen examples representing the tendency of user's motions.

DESCRIPTION OF EMBODIMENTS

Embodiments of the present disclosure will be described below with reference to the drawings. In the following description, the same parts are denoted with the same reference signs. Their names and functions are also the same. Therefore, a detailed description thereof will not be repeated.

First Embodiment

<1. Configuration Overview of Evaluation Information Provision System>

Figure 1:
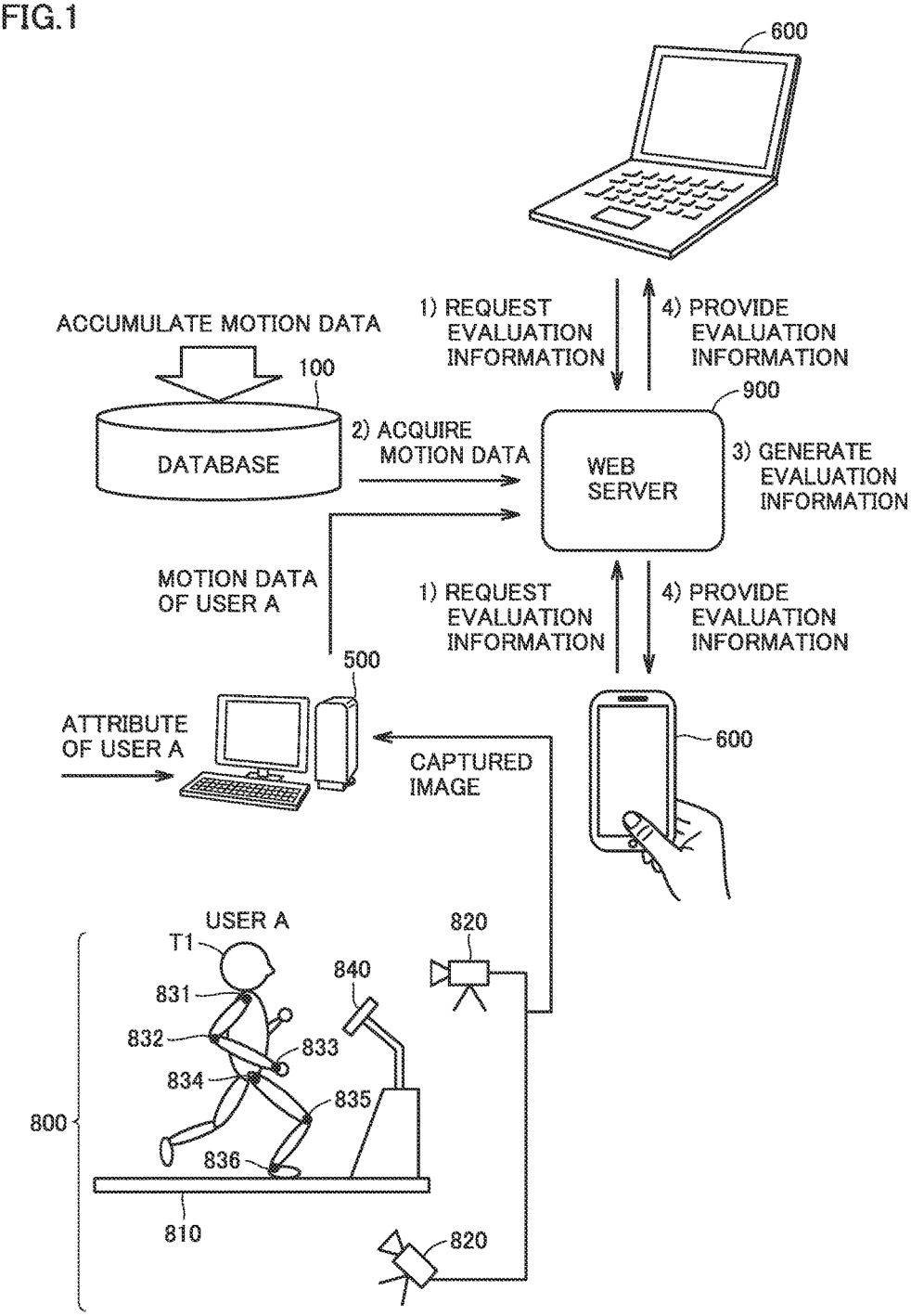
FIG. 1 is a diagram for explaining an overview of an evaluation information provision system.

FIG. 1 is a diagram for explaining the overview of an evaluation information provision system. The evaluation information provision system provides a user with information for evaluating the user's motion, based on data for the user's motion. In the evaluation, data for motions of a large number of subjects is used. As used in the present description, the person to be provided with information is called "user", and the person who provides data to be utilized for provision of information is generally called "subject". There may be a single subject or there may be a plurality of subjects. In particular, when database 100 uses big data as data representing subject's motions, the number of subjects is large.

As shown in FIG. 1, the evaluation information provision system includes a database 100 storing subject's motion data, a Web server 900, a user terminal 600 on which a user views the provided information, a running machine 800 generating data for the user's motion, and an arithmetic processing unit 500 processing data generated from running machine 800 and registering the processed data in Web server 900.

Running machine 800 includes markers 831 to 836 attached to six parts (shoulder, elbow, wrist, base of thigh, knee, ankle) on the right side of a user T1. User T1 runs on a treadmill 810 while wearing markers 831 to 836. In running machine 800, two high-speed cameras 820 capture images of markers 831 to 836 and input the captured images to arithmetic processing unit 500. Arithmetic processing unit 500 is implemented, for example, by a general-purpose computer installed with an application for image processing. Arithmetic processing unit 500 analyzes the input image to acquire the path and/or the moving speed of each of markers 831 to 836 and generates motion data of user T1 based on the path and/or the moving speed. An attribute of the user is further input to arithmetic processing unit 500. Arithmetic processing unit 500 outputs the attribute and the motion data of the user to Web server 900. Web server 900 outputs information evaluating the user's motion, using the attribute and the motion data of the user. In FIG. 1, the parts denoted as markers 831 to 836 are an example of a combination of parts representing the user's characteristic motion. The markers may be attached to other parts of the user as long as data representing the user's motion can be acquired.

In the first embodiment, the user requests information for evaluating the user's motion from Web server 900 through user terminal 600. In response, Web server 900 generates information serving as a reference for evaluation, using data for subject's motions stored in database 100. Web server 900 then outputs information evaluating the user's motion to user terminal 600, using the data for the user's motion and the reference generated as described above. The user views the output information on user terminal 600. An example of user terminal 600 is a personal computer. Another example of user terminal 600 is a smartphone. User terminal 600 is not limited to these examples as long as it has a display screen.

The motion to be evaluated may be the motion of a person different from the person who views the evaluation. That is, for example, information evaluating the motion of user T1 may be viewed by the manager of user T1 on user terminal 600.

<2. Processing Overview in Evaluation Information Provision System>

Figure 2:
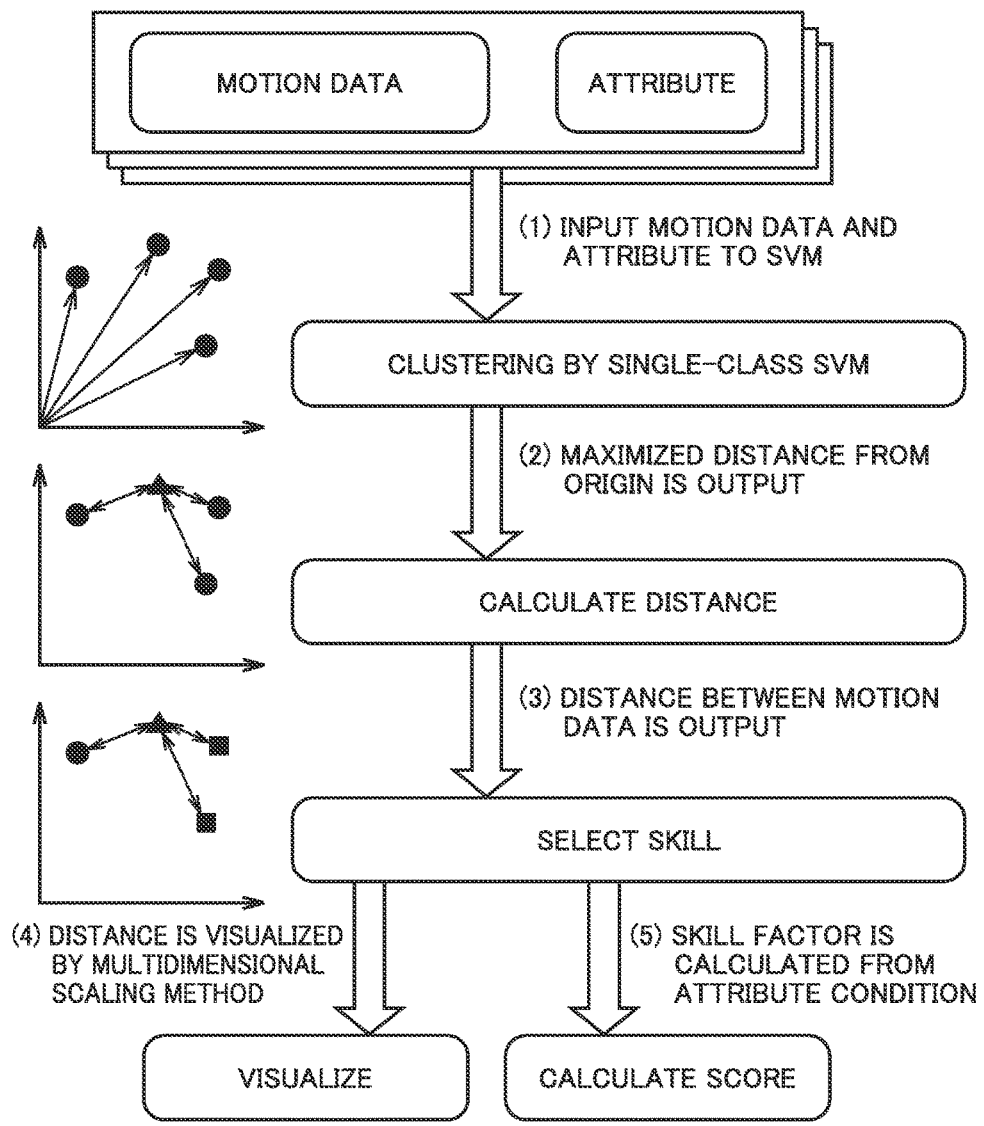
FIG. 2 is a diagram for explaining an overview of processing in the evaluation information provision system.
Figure 3:
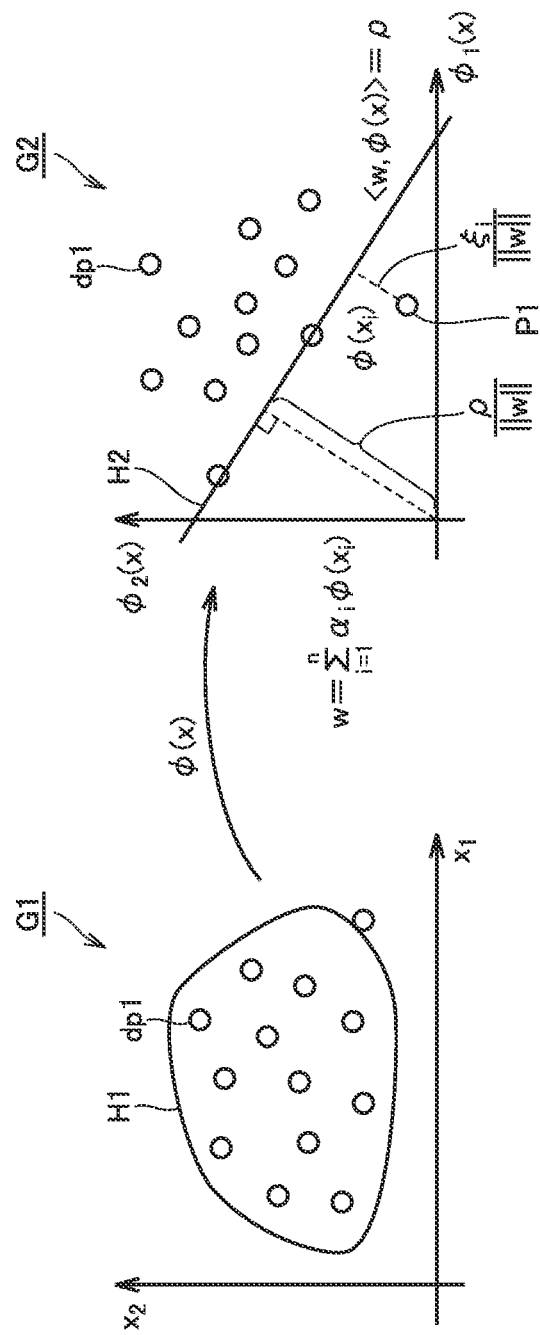
FIG. 3 is a diagram for explaining an overview of processing in the evaluation information provision system.
Figure 4:
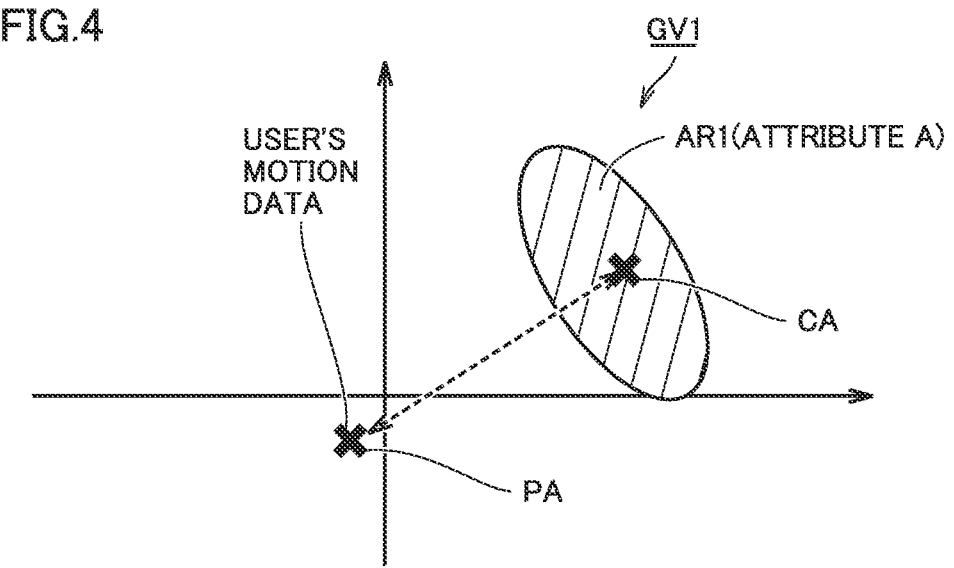
FIG. 4 is a diagram for explaining an overview of processing in the evaluation information provision system.

FIG. 2 to FIG. 4 are diagrams for explaining the processing overview in the evaluation information provision system. First, as shown in FIG. 2, in database 100, data representing a subject's motion (hereinafter referred to as "motion data") is stored in association with the attribute of the data. An example of the data representing a motion is biomechanics data such as joint angle and angular velocity. Another example is the acceleration in each of the directions of axes at right angles to each other (for example, x-axis, y-axis, and z-axis) as detected by an accelerometer attached to the user. Yet another example is the angular velocity in planes at right angles to each other (xy plane, yz plane, and zx plane) as detected by a gyro sensor attached to the user.

An example of the attribute is the attribute of the person who makes a motion corresponding to motion data. The person's attribute is, for example, name, gender, age, height, weight, monthly training amount, or full marathon running time. Another example of the attribute is the date, time or place (geographical information in the region where the motion is made) at which the motion data is acquired. Yet another example of the attribute is information that distinguishes the tool (for example, running shoes) that the person who makes a motion uses in the motion. In the present disclosure, the attribute may include information that distinguishes the superiority/inferiority of the motion, such as running time in a full marathon. The attribute may include information that distinguishes the property other than the superiority/inferiority of the motion, such as the name or the gender of the person who performs the motion.

In the evaluation information provision system, a set of motion data and attribute may be provided, for example, as big data from every data source (server device and the like) on a network.

Then, as shown in item (1) in FIG. 2, the evaluation information provision system outputs the motion data in database 100 together with the attribute associated with each motion data to an SVM (Support Vector Machine). In the evaluation information provision system in the first embodiment, the SVM is implemented by the function implemented by execution of a program for SVM in a computer that configures Web server 900. Clustering of motion data is thus executed as shown as graph G1 in FIG. 3.

More specifically, graph G1 in FIG. 3 schematically shows an N-dimensional graph including N factors in two dimensions.

For example, a dot dpi represents a combination of N sets of motion data of a certain subject.

Web server 900 generates a hyperplane covering motion data, as denoted as hyperplane H1 in graph G1, by clustering. When the number of dimensions of motion data is N, hyperplane H1 in graph G1 in FIG. 3 is an N-dimensional plane. The number of dimensions of motion data equals to that of the kinds of data included in the motion data. For example, when four kinds of data, namely, the joint angle of the elbow, the joint angle of the knee, the angular velocity of the elbow, and the angular velocity of the knee, are employed as motion data, hyperplane H1 is a four-dimensional plane.

Furthermore, clustering by SVM is performed to calculate the maximized distance for the limitation of the hyperplane, for each motion data (item (2) in FIG. 2).

Subsequently, the evaluation information provision system processes the motion data by the method called kernel method. Thus, as shown by dot dpi and the like in graph G2 in FIG. 3, each point of motion data is nonlinearly transformed.

After the nonlinear transformation as described above, the distance between motion data is calculated ("Calculate Distance" in FIG. 2). Here, as described later using mathematical expressions, the distance (statistical distance) from another motion data is calculated for each motion data (item (3) in FIG. 2).

Next, the evaluation information provision system accepts assignment of an attribute, in "Select Skill". The attribute may be assigned by the user inputting an attribute or may be assigned by reading out an attribute registered in the evaluation information provision system in advance. An example of the attribute to be assigned is that "the running time in a full marathon is over 2 hours under 3 hours". Here, "the running time in a full marathon" is the actually measured time when the subject or the user actually ran a full marathon or the estimated finish time in a full marathon for the subject or the user. The estimated finish time in a full marathon is the estimated time to complete a full marathon. The estimated finish time in a full marathon is calculated, for example, in accordance with the finish time in the past of each person and input by the person to each server. Another example of the attribute is that "the age is 20's".

Then, the evaluation information provision system provides information for the user's motion as described in item (4) or item (5) in FIG. 2.

More specifically, in item (4) in FIG. 2, the evaluation information provision system visualizes the subject's motion data belonging to the assigned attribute and the user's motion data, using the multidimensional scaling method (MDS). GV1 in FIG. 4 illustrates the subject's motion data belonging to attribute A (for example, "running time in full marathon is over 2 hours under 3 hours") and the user's motion data, by a two-dimensional graph according to the multidimensional scaling method.

In graph GV1, the distance between motion data belonging to the attribute for the subject's motion data belonging to the assigned attribute is illustrated according to the multidimensional scaling method. More specifically, the distance between motion data of attribute A is shown by area AR1. In graph GV1, point CA shows the feature data representing the feature of attribute A that is selected in the manner described later. In graph GV1, the distance from the motion data of attribute A for the user's motion data is shown by points PA and CA.

As shown in item (5) in FIG. 2, the evaluation information provision system outputs the score of the user's motion for the assigned attribute as described above. The score of the user's motion is calculated using the statistical distance from the user's motion data to the aforementioned feature data. The details of the method of calculating the score will be described later.

<3. Hardware Configuration>

The hardware configuration of the main devices (Web server 900 and user terminal 600 in FIG. 1) in the evaluation information provision system will be described.

(1) Web Server 900

Figure 5:
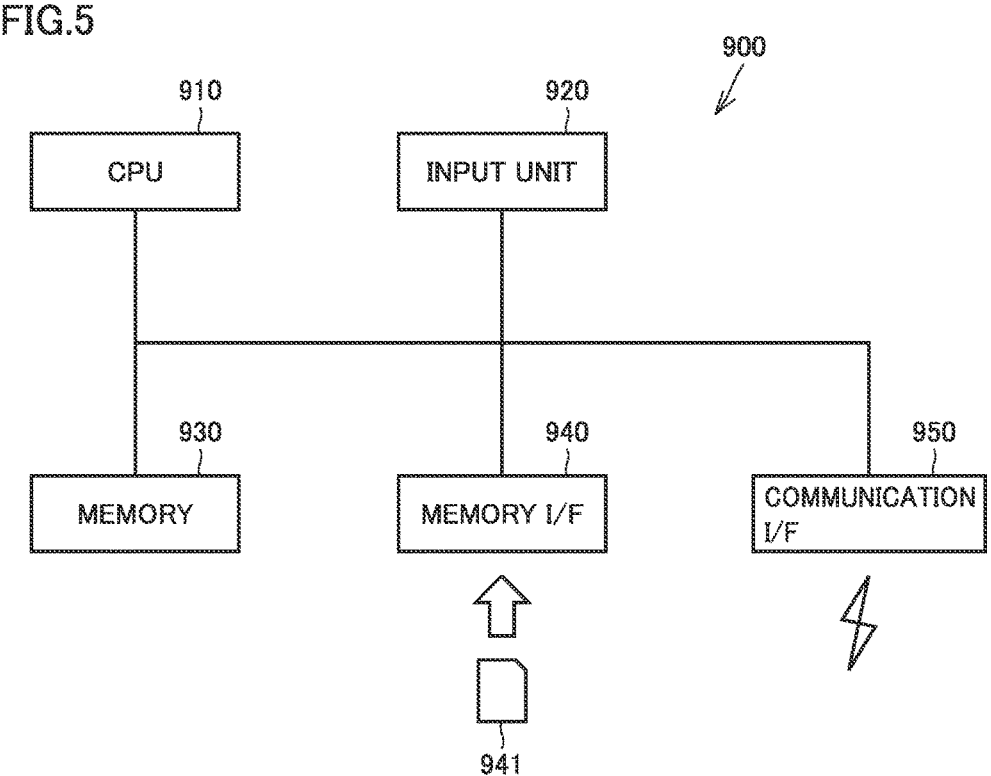
FIG. 5 is a diagram schematically showing a hardware configuration of a Web server.

FIG. 5 is a diagram schematically showing the hardware configuration of Web server 900. As shown in FIG. 5, Web server 900 includes, as main components, a CPU (Central Processing Unit) 910, an input unit 920 such as a keyboard, a memory 930, a memory interface 940, and a communication interface 950. CPU 910, input unit 920, memory 930, memory interface 940, and communication interface 950 are connected with each other through an internal bus.

Memory 930 is implemented by a storage device such as a RAM (Random Access Memory) or a ROM (Read Only Memory). Memory 930 stores a program executed by CPU 910 and data used in execution of the program.

Memory interface 940 reads out data from an external storage medium 941. Storage medium 941 is removable from Web server 900. CPU 910 reads out data stored in external storage medium 941 through memory interface 940 and stores the data into memory 930. CPU 910 also reads out data from memory 930 and stores the data into storage medium 941 through memory interface 940. The program executed by CPU 910 may be stored in storage medium 941. Alternatively, the program executed by CPU 910 may be downloaded through a network such as a public network and stored into memory 930.

Communication I/F 950 is implemented by an antenna and a connector.

Communication I/F 950 transmits/receives data to/from another device through wired communication or wireless communication. CPU 910 receives a program, image data, text data, and the like from another device through communication I/F 950 and transmits image data and text data to another device.

CPU 910 executes a program stored in memory 930 or storage medium 941 to control each unit of Web server 900.

(2) User Terminal 600

Figure 6:
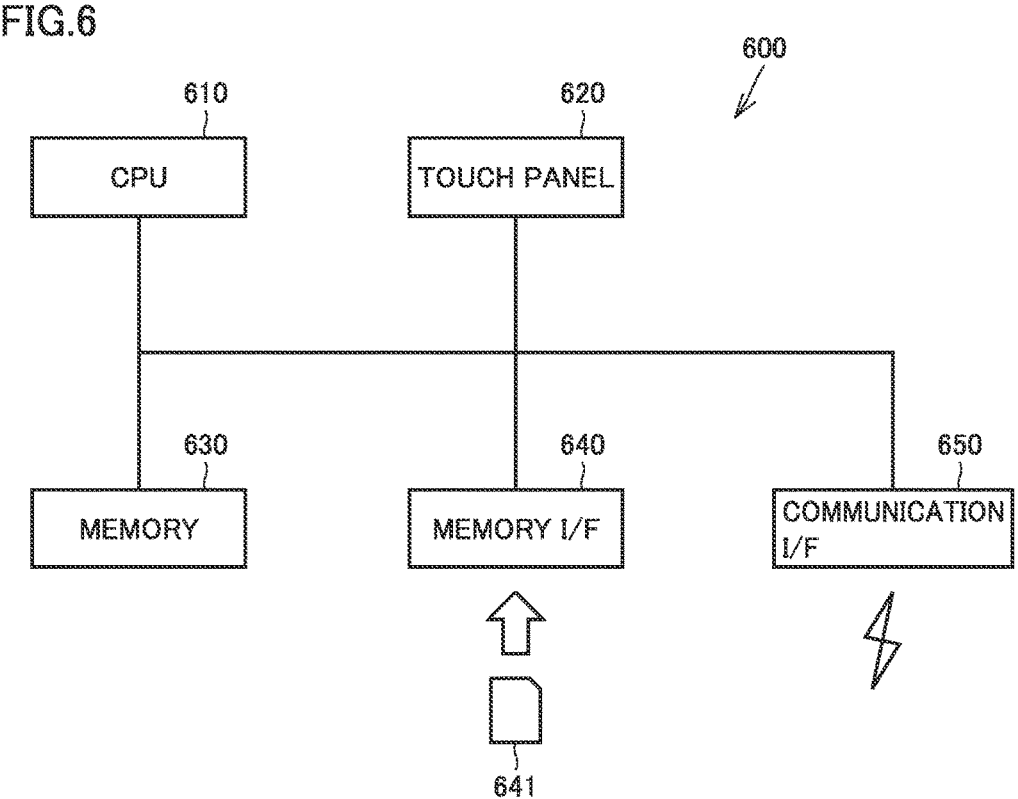
FIG. 6 is a diagram showing a main hardware configuration of a user terminal.

FIG. 6 is a diagram showing a main hardware configuration in user terminal 600. As shown in FIG. 6, user terminal 600 includes, as main components, a CPU 610, a touch panel 620, a memory 630, a memory interface 640, and a communication interface 650.

Touch panel 620 may be of any type, such as resistive touch panel, surface acoustic wave touch panel, infrared touch panel, electromagnetic induction touch panel, and capacitance touch panel. Touch panel 620 may include an optical sensor liquid crystal panel. Touch panel 620 detects a touch operation on touch panel 620 with an external object at regular intervals and inputs the touch coordinates (touch position) to CPU 610. In other words, CPU 610 successively acquires the touch coordinates from touch panel 620.

Memory 630 is implemented by a storage device such as a RAM or a ROM. Memory 630 stores a program executed by CPU 610 and data used in execution of the program.

Memory interface 640 reads out data from an external storage medium 641. Storage medium 641 is removable from user terminal 600. CPU 610 reads out data stored in external storage medium 641 through memory interface 640 and stores the data into memory 630. CPU 610 also reads out data from memory 630 and stores the data into storage medium 641 through memory interface 640. The program executed by CPU 610 may be stored in storage medium 641. Alternatively, the program executed by CPU 610 may be downloaded through a network such as a public network and stored into memory 630.

Communication I/F 650 is implemented by an antenna and a connector. Communication I/F 650 transmits/receives data to/from another device through wired communication or wireless communication. CPU 610 receives a program, image data, text data, and the like from another device through communication I/F 650 and transmits image data and text data to another device.

CPU 610 executes a program stored in memory 630 or storage medium 641 to control each unit of user terminal 600.

CPU 610 also transmits the provision of evaluation information to Web server 900 and executes an application program for providing (displaying) evaluation information. CPU 610 executes the application program to display a screen such as screen IMG00 in FIG. 10 described later on touch panel 620.

<4. Functional Blocks>

Figure 7:
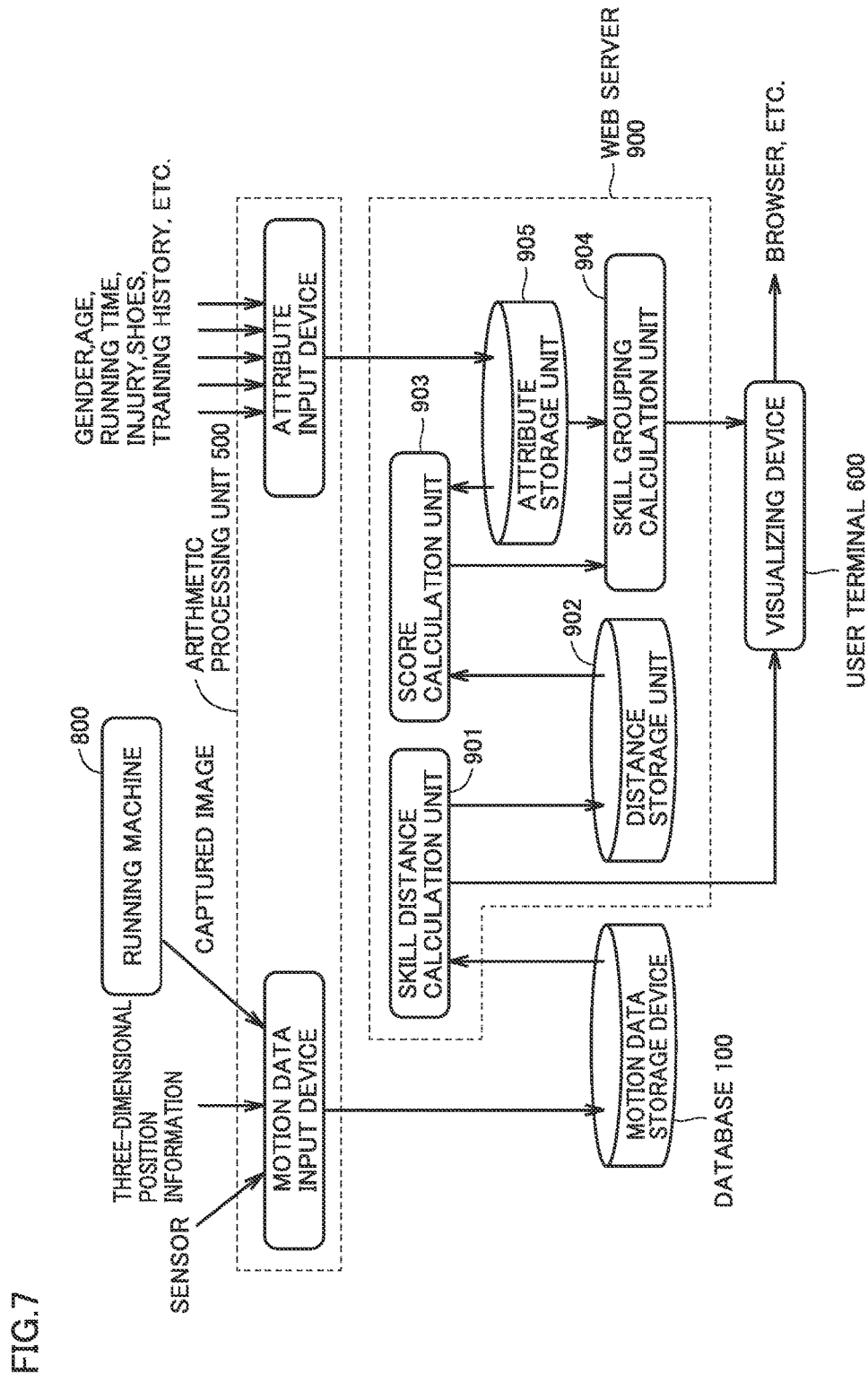
FIG. 7 is a diagram showing an example of functional blocks of the evaluation information provision system shown in FIG. 1.

FIG. 7 is a diagram showing an example of the functional blocks of the evaluation information provision system shown in FIG. 1.

Referring to FIG. 7, in the evaluation information provision system in the first embodiment, database 100 functions as a motion data storage device storing subject's motion data. Database 100 may be implemented by a plurality of server devices connected to a variety of networks.

Arithmetic processing unit 500 functions as a motion data input device which generates motion data of a subject as an input to database 100 and generates motion data of a user for input to Web server 900. Arithmetic processing unit 500 generates motion data of a user (and subject), for example, using an image input from running machine 800. Arithmetic processing unit 500 further accepts input of attributes of a user (and subject) and outputs the attribute to Web server 900. Here, arithmetic processing unit 500 functions as an attribute input device. The motion data and the attribute may be inputted via Web server 900 from a device other than arithmetic processing unit 500.

Web server 900 functions as a skill distance calculation unit 901, a distance storage unit 902, a score calculation unit 903, a skill grouping calculation unit 904, and an attribute storage unit 905.

More specifically, of the functions of Web server 900 shown in FIG. 7, skill distance calculation unit 901 and skill grouping calculation unit 904 are implemented, for example, by CPU 910 (FIG. 5) executing a predetermined program. Distance storage unit 902, score calculation unit 903, and attribute storage unit 905 are implemented by memory 930 (FIG. 5).

Skill distance calculation unit 901 executes the aforementioned nonlinear transformation and further calculates a statistical distance between motion data, for the subject's motion data and the user's motion data input from the motion data storage device.

Distance storage unit 902 stores the distance from another motion data that is calculated for each motion data.

Score calculation unit 903 calculates the score for the user's motion, using the statistical distance for the motion data calculated by skill distance calculation unit 901.

Attribute storage unit 905 stores the user's attribute.

Skill grouping calculation unit 904 generates information for specifying a skill (attribute) that gives a large effect to a motion, from the attributes calculated for a plurality of attributes, as illustrated in the display in FIG. 19 described later.

<5. Calculation of Statistical Distance Between Motion Data>

Here, the calculation of the statistical distance between motion data will be described. In the present description, the statistical distance between motion data may be simply referred to as "distance".

The distance between motion data is calculated by processing the motion data with a single-class SVM. The processing with a single-class SVM is as described below.

In the single-class SVM, as shown in Formula (1), a time point i (where i is 1, 2 ... n) of the motion data of a subject or a user is defined. In Formula (1), d is the kind of data included in a set of motion data. It can be said that the number of kinds represents the dimensions of the motion data.

$$x_{u,i} \in \mathbb{R}^d \tag{1}$$

Here, $\phi(x)$ represents mapping from input space X to feature space H. Then, by setting the hyperplane in feature space H such that it separates more sets of motion data at a distance further from the origin, we can describe any hyperplane in feature space H, as shown in Formula (2) below.

$$[x \in X | <w, \phi(x)> - \rho = 0] (\rho \geq 0) \tag{2}$$

Such a hyperspace can be obtained by solving Formula (3) below. Here, $\xi_i$ is a slack variable. $v$ is a positive parameter for adjusting the amount of possible position toward the origin.

$$\max_{w,\xi,\rho} -\frac{1}{2}\|w\|^2 - \frac{1}{vn}\sum_{i=1}^{n}\xi_i + \rho \tag{3}$$

$$\text{s.t.} \langle w, \phi(x_{u,i}) \rangle \geq \rho - \xi_i \text{ and } \xi_i \geq 0 (i = 1, \ldots, n)$$

The kernel function is represented by Formula (4) below.

$$k: X \times X \to \mathbb{R} \tag{4}$$

The kernel function in Formula (4) is defined as shown in Formula (5) below.

$$k(x,x') = <\phi(x), \phi(x')> (k(x,x') \in H) \tag{5}$$

Here, the dual is obtained as Formula (6) below.

$$\max_{\alpha,\rho} \frac{1}{2} \sum_{i=1}^{n} \sum_{j=1}^{n} \alpha_i \alpha_j k(x_i, x_j) \tag{6}$$

$$\text{s.t.} 0 \leq \alpha_i \leq \frac{1}{vn} (i = 1, \ldots, n) \text{ and } \sum_{i=1}^{n} \alpha_i = 1$$

This optimization can be solved using the quadratic programming solver. It is defined as Formula (7) below.

$$k(x,x') = \exp(-\|x-x'\|^2/(2\sigma^2)) \tag{7}$$

In Formula (7), $\sigma > 0$, and $\sigma$ is a parameter (kernel width) of the kernel function, which is usually a commonly used parameter.

The calculation of the distance between models for single-class SVM models of motion data described as "nonlinearly transformed motion data" will now be described.

Distance $D_{uv}$ between two single-class SVM models "($\alpha_u$, $\rho_u$)" and "($\alpha_v$, $\rho_v$)" is expressed as Formula (8) below.

$$D_{uv} = \frac{\widetilde{c_u c_v}}{\widetilde{c_u p_u} + \widetilde{c_v p_v}} \tag{8}$$

$\widetilde{c_u c_v}$, $\widetilde{c_u p_u}$, $\widetilde{c_v p_v}$ are arcs between two points and written as "$\sim c_u c_v \sim$", "$\sim c_u p_u \sim$", and "$\sim c_v p_v \sim$", respectively in the description.

In Formula (8), each of u and v assigns a subject or a user. In Formula (8), $c_u$, $c_v$, $p_u$, $p_v$ are each defined using a unit circle CR1 as shown in FIG. 8.

Figure 8:
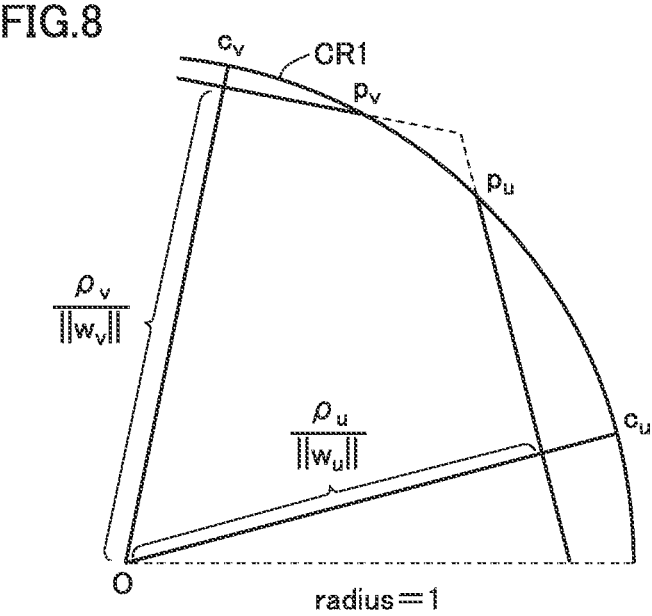
FIG. 8 is a diagram for explaining a method of calculating a statistical distance between motion data.

In FIG. 8, $w_u$ is defined by Formula (9) below.

$$w_u = \Sigma_i \alpha_i \phi(x_{ui}) \qquad (9)$$

Here, $D_{uv}$ in Formula (8) is the normalized distance in a similar point of view as the Fischer ratio as described in, for example, two documents ("F. Desobry, M. Davy, and C. Doncarli, "An online kernel change detection algorithm," IEEE TRANSACTIONS ON SIGNAL PROCESSING, vol. 53, no. 8, pp. 2961-2974, 2005." and "P. S. Riegel, "Athletic records and human endurance," American Scientist May/June 1981, vol. 69, no. 3, p. 285, 1981.").

The arc from point $c_u$ to point $p_u$ in Formula (8) (in the present description, written as "$\sim c_u p_u \sim$" for the sake of convenience) is the scale of variance of samples in $\phi(x)$ in the feature space. When the spread between samples increases, the length of the arc "$\sim c_u p_u \sim$" increases, and the margin represented by Formula (10) below is reduced.

$$\rho_u / \|w_u\| \qquad (10)$$

Therefore, the aforementioned distance exhibits the behavior predicted in the feature space (that is, as the spread increases, the value increases, and as the overlap increases, the value decreases).

Distance $D_{uv}$ in Formula (8) is calculated using the parameter estimated as below. That is, the distance is represented by the unit circle and the length of the arc between two vectors a and b ("$\sim ab \sim$"). The length of the arc between the vectors a and vector b is equivalent to the angle formed between these vectors. For the vectors a and vector b, Formula (11) below holds.

$$\langle a,b \rangle = \|a\|\|b\|\cos(\angle(a,b)) = \cos(\angle(a,b)) \qquad (11)$$

Thus, the length of the arc between the two vectors a and b is derived by Formula (12) below.

$$\widehat{ab} = \arccos(\langle a,b \rangle) \qquad (12)$$

Therefore, the length of the arc of $c_u c_v$ is derived according to Formula (15) using $c_u$ derived from Formula (13) below and $c_v$ derived from Formula (14).

$$c_u = w_u / \|w_u\| \qquad (13)$$

$$c_v = w_v / \|w_v\| \qquad (14)$$

$$\widehat{c_u c_v} = \arccos\left(\frac{\langle w_u, w_v \rangle}{\|w_u\|\|w_v\|}\right)$$

$$= \arccos\left(\frac{\alpha_u^\top K_{uv} \alpha_v}{\sqrt{\alpha_u^\top K_{uu} \alpha_u} \sqrt{\alpha_v^\top K_{vv} \alpha_v}}\right) \qquad (15)$$

In Formula (15), $K_{uv}$ is a kernel matrix. The kernel matrix is represented by element k ($x_{u,i}$, $x_{u,j}$) for column i and row j.

Similarly, the length of the arc of $c_u p_u$ is represented by Formula (16) below.

$$\widehat{c_u c_v} = \arccos\left(\frac{\rho_u}{\sqrt{\alpha_u^\top K_{uu} \alpha_u}}\right) \qquad (16)$$

As described above, the distance from the origin for each motion data is calculated through the computation of the single-class SVM model. Then, the distance between non-linearly transformed motion data is obtained from the respective distances from the origin.

FIG. 9 is a diagram schematically showing a manner in which the calculated distance between motion data is stored. CPU 910 of Web server 900, for example, calculates the distances among all-to-all motion data by applying two or more sets of motion data (subject's motion data) registered in database 100. CPU 910 then stores the calculated distance into memory 930, for example, in the manner shown in FIG. 9. In the distance matrix shown in FIG. 9, the distances calculated for the all-to-all combination of the five sets of motion data, namely, motion data d(1) to d(5), are registered in the form of a matrix. In the distance matrix, the distance between identical motion data (for example, the distance between motion data d(1), the diagonal elements extending from the upper left to the lower right of the matrix) has a value of "0".

<6. Score Calculation Method>

Referring now to FIG. 10 to FIG. 14, the method of score calculation provided to the user will be described.

Figure 10:
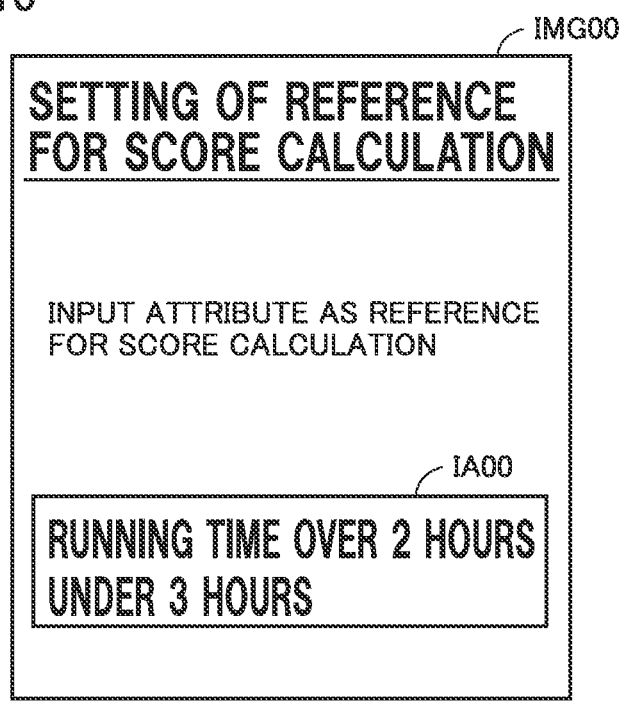
FIG. 10 is a diagram showing an example of the screen appearing on the user terminal for assigning an attribute.

In the evaluation information provision system, the user assigns an attribute serving as the reference of a score. FIG. 10 is a diagram showing an example of the screen for assigning an attribute that appears on user terminal 600. CPU 610 displays the screen, for example, by executing an application program for providing (displaying) evaluation information.

Screen IMG00 in FIG. 10 includes a field IA00 for inputting an attribute. In FIG. 10, "running time over 2 hours under 3 hours" is illustrated as an example of the attribute. User terminal 600 transmits the assigned attribute to Web server 900.

Web server 900, accepting assignment of the attribute, selects motion data stored in association with the assigned attribute, from among subject's motion data. For example, when the attribute "running time over 2 hours under 3 hours" is assigned, CPU 910 selects motion data associated with "running time over 2 hours under 3 hours" from the motion data stored in database 100.

CPU 910 of Web server 900 then calculates the distances between nonlinearly transformed motion data for the selected subject's motion data, by all-to-all calculation. When the distances calculated by all-to-all calculation have already been stored in memory 930, the matrix (FIG. 9) of the stored distances is read out.

CPU 910 then calculates the mean value of absolute values of the distances, for each motion data. FIG. 11 shows the mean value calculated for each motion data of the matrix shown in FIG. 9, as matrix M1.

Here, the motion data having the lowest mean value is the motion data in which the sum of distances from another motion data belonging to the assigned attribute is the smallest, and therefore can be assumed as motion data that represents the feature of the attribute.

CPU 910 then specifies motion data having the smallest mean value, as feature data, from among motion data belonging to the assigned attribute. In the example illustrated as matrix M2 in FIG. 11, motion data d(1) is specified as the feature data.

On the other hand, CPU 910 calculates the distance between the user's motion data and each motion data belonging to the assigned attribute. Matrix M2 in FIG. 11 is a distance matrix in which the calculation result for the user's motion data is added to the matrix in FIG. 9. In matrix M2 in FIG. 11, the calculation result for the user's motion data is illustrated as data for user d (X).

CPU 910 then ranks each motion data, based on the distance of each motion data from the feature data, as illustrated as frame F in matrix M3 in FIG. 11. As the distance from the feature data is closer, the given rank is closer to the first place. User (X) is ranked in the second place, as shown in Table T01 in FIG. 12.

CPU 910 then calculates the user's score S according to Formula (17) below.

$$\{(N-M+1)/N\} \times 100 = S \quad (17)$$

(where M≥1)

In Formula (17), N is the number of sets of motion data belonging to the assigned attribute. M is the rank ("2" in the example of Table T01 in FIG. 12) of the user's mean value.

For example, as illustrated in the example of Table T01 in FIG. 12, when the number of sets of motion data belonging to the assigned attribute is "5" and the user's rank is "2", the user's score S for the assigned attribute is calculated as "80 points" according to Formula (18) below.

$$\{(5-2+1)/5\} \times 100 = 80 \quad (18)$$

Figure 13:
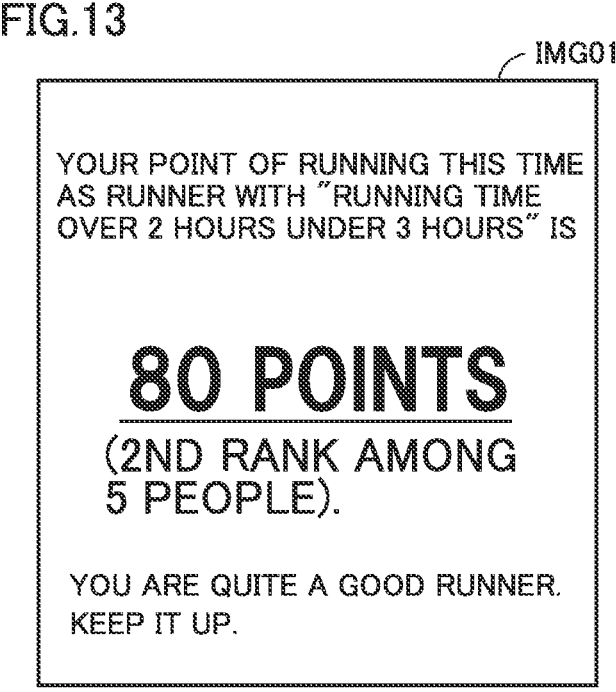
FIG. 13 is a diagram showing an example of the screen displaying the user's score.

FIG. 13 is a diagram showing an example of the screen displaying the user's score calculated according to Formula (17). CPU 910 transmits the calculation result of the score to user terminal 600. In response, user terminal 600 displays screen IMG01 in FIG. 13 on touch panel 620. Screen IMG01 displays the calculated score (80 points).

CPU 910 may additionally transmit the values N, M in Formula (17) to user terminal 600. In response, CPU 610 of user terminal 600 may display the values N, M on screen IMG01. Screen IMG01 in FIG. 13 includes a character string "2nd place in 5 people" based on the values N, M.

Figure 14:
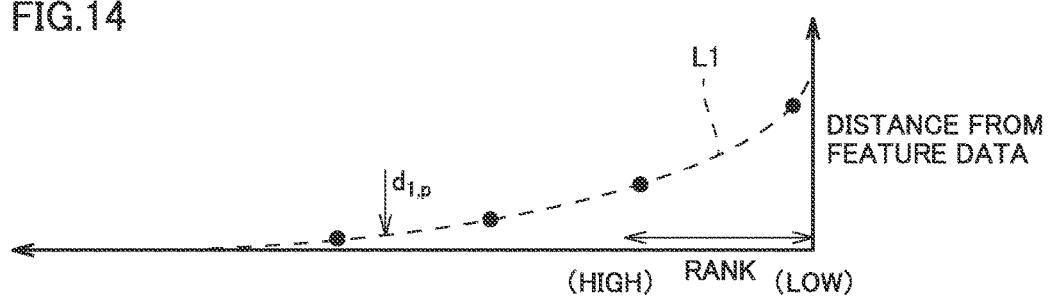
FIG. 14 is a diagram for explaining the concept of calculation of a score.

FIG. 14 is a diagram for explaining the concept of calculation of the score in more details.

According to the present disclosure, when an attribute is assigned, feature data in the attribute is selected based on the distance between motion data belonging to the attribute. The motion data in the assigned attribute is arranged in the order of distances from the feature data as shown in FIG. 14, and the user's motion data is also added to the order of distances regarding the assigned attribute, focusing on the feature data. In FIG. 14, the mark "●" shows the distance of each motion data in the assigned attribute. Furthermore, "$d_{1\_p}$" indicates the distance of the user's motion data. Line L1 represents the overall tendency of the distances focusing on the feature data regarding the selected motion data with respect to the assigned attribute.

The rank of the user's motion data for the distance from the feature data is then specified. The user's score for the assigned attribute is then calculated according to Formula (17), using the specified rank ("M" in Formula (17)) and the number of sets of motion data associated with the assigned attribute ("N" in Formula (17)).

<7. Display of History of Scores>

In the evaluation information provision system in the present disclosure, CPU 910 may store the score calculated for the user in memory 930 in association with the time when the calculation is conducted (or the time when the user's motion data used in the calculation is generated).

CPU 910 then transmits the history of the calculated scores to user terminal 600 in accordance with the operation in user terminal 600. In response, at user terminal 600, CPU 610 may display history of the calculated scores on touch panel 620.

For example, the user designates a target period of display of history, using user terminal 600. First, CPU 610 transmits the designated period to Web server 900. After that, CPU 910 acquires the history of scores in the designated period and transmits the acquired history to user terminal 600. Finally, CPU 610 displays the history of scores transmitted from Web server 900.

Figure 15:
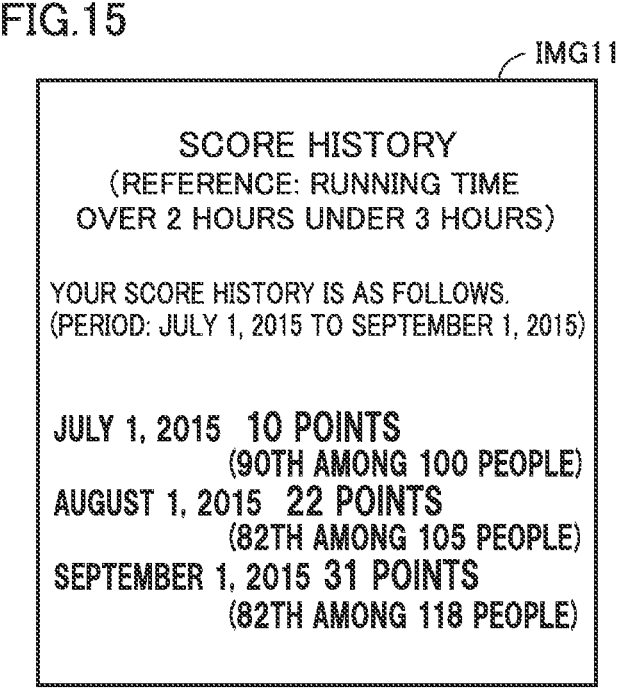
FIG. 15 is a diagram showing an example of display of history of scores.

FIG. 15 is a diagram showing an example of the display of history of scores. Screen IMG11 in FIG. 15 displays an example of the designated period (Jul. 1, 2015 to Sep. 1, 2015) and the history of scores calculated in this period. The history of scores displayed on screen IMG11 includes three scores, that is, "10 points" calculated on Jul. 1, 2015, "22 points" calculated on Aug. 1, 2015, and "31 points" calculated on Sep. 1, 2015. Each score is shown together with the number N of sets of motion data used in calculation of the score and the user's rank. For example, the score "10 points" calculated on Jul. 1, 2015 is shown together with a character string "90th rank among 100 people".

CPU 610 of user terminal 600 may generate information representing the tendency of the user's motions using the history of scores and display the generated information on touch panel 620. For example, CPU 610 approximates the change of score over time by a straight line by the least-squares method and specifies whether the change of scores tends to rise or fall depending on whether the inclination of the approximated straight line is positive or negative.

FIG. 16 is a diagram showing an example of two screens illustrating the tendency of the user's motion.

Screen IMG12 in FIG. 16 shows a display example in the case where the score tends to rise over time. Screen IMG12 includes a positive message "Your score is generally going up! Keep on going!".

Screen IMG13 in FIG. 16 shows a display example in the case where the score tends to fall over time. Screen IMG13 includes a message to encourage the user to improve, "Your score is generally going down. You may need to improve your form."

The messages displayed on screen IMG12 and screen IMG13 are, for example, stored in memory 630 in association with the respective tendencies. CPU 610 selects the message associated with the specified tendency and displays the selected message on touch panel 620.

Figure 17:
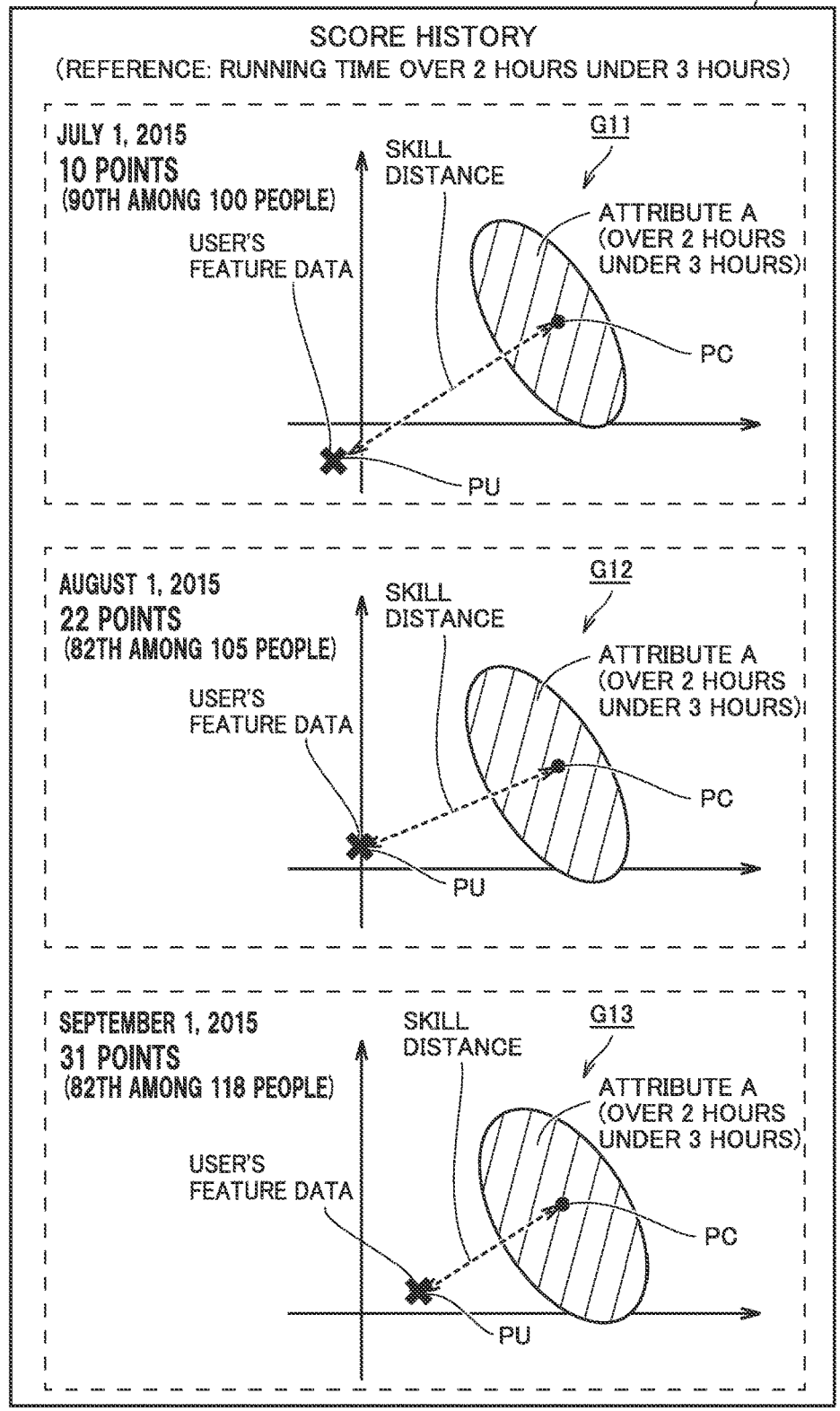
FIG. 17 is a diagram showing another example of history of scores.

FIG. 17 is a diagram showing another example of the history of scores. Screen IMG21 in FIG. 17 displays each score included in the history, together with a graph that visualizes the statistical distance between the motion data associated with the assigned designated attribute and the user's motion data, for example, by the multidimensional scaling method.

More specifically, in screen IMG21, the "10 points" calculated on Jul. 1, 2015 is displayed together with a graph G11. The "22 points" calculated on Aug. 1, 2015 is displayed together with a graph G12. The "31 points" calculated on Sep. 1, 2015 is displayed together with a graph F13. In each of graphs G11 to G13, a point PU represents the user's motion data. A point PC represents the feature data in the assigned attribute. In each of graphs G11 to G13, as the score rises, the distance between point PU and point PC is shortened. Based on this, the distance between point PU and point PC is a distance changing according to the value of the score for the assigned attribute and therefore can be recognized as an index of proficiency for the attribute, as "skill distance".

<8. Specification of Skill (Attribute) Having Large Effect on Motion>

The evaluation information provision system may accept assignment of two kinds of attributes. More specifically, the evaluation information provision system accepts assignment of a single attribute as an attribute of a first kind and further accepts assignment of two or more kinds of attributes as attributes of a second kind. The evaluation information provision system then calculates the score when the attribute of the first kind is combined with each of the attributes of the second kind. The evaluation information provision system then compares the scores calculated for the attributes of the second kind to specify an attribute that has a large effect on the score for the attribute of the first kind from among two or more attributes assigned as the second kind.

Figure 18:
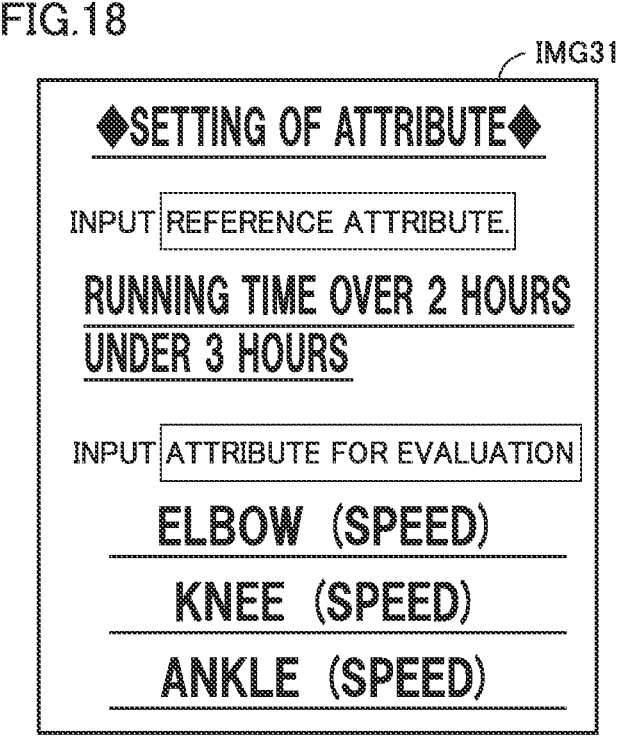
FIG. 18 is a diagram showing an example of a screen for accepting assignment of two kinds of attributes.

FIG. 18 is a diagram showing an example of the screen for accepting assignment of two kinds of attributes.

Screen IMG31 in FIG. 18 accepts an attribute of the first kind as a "reference attribute" and accepts attributes of the second kind as "attributes for evaluation". More specifically, the attribute "running time over 2 hours under 3 hours" is accepted as an attribute of the first kind (reference attribute). An attribute "elbow (speed)", an attribute "knee (speed)", and an attribute "ankle (speed)" are accepted as attributes of the second kind (attributes for evaluation).

The attribute "elbow (speed)" means the measured value of moving speed of the elbow. The attribute "knee (speed)" means the measured value of moving speed of the knee. The attribute "ankle (speed)" means the measured value of moving speed of the ankle.

When assignment as shown in FIG. 18 is accepted, CPU 910 calculates three scores. The first score is calculated using the motion data of the subjects and the user that is associated with the attribute of the first kind (running time over 2 hours under 3 hours) and associated with the first attribute (elbow (speed)) of the second kind.

The second score is calculated using the motion data of the subjects and the user that is associated with the attribute of the first kind (running time over 2 hours under 3 hours) and associated with the second attribute (knee (speed)) of the second kind.

The third score is calculated using the motion data of the subjects and the user that is associated with the attribute of the first kind (running time over 2 hours under 3 hours) and associated with the third attribute (ankle (speed)) of the second kind.

CPU 910 then transmits the results of calculation of the three scores to user terminal 600. In response, CPU 610 of user terminal 600 displays the results on touch panel 620. FIG. 19 is a diagram showing an example of the display screen of the calculation results of the three scores.

Figure 19:
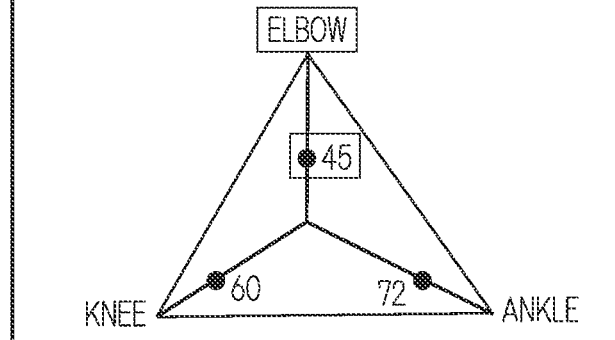
FIG. 19 is a diagram showing an example of a display screen of the calculation results of three scores.

Screen IMG32 in FIG. 19 shows the score for each of the three attributes assigned as attributes for evaluation, together with the item (running time) assigned as a reference attribute. In addition, screen IMG32 collectively illustrates the respective scores of the three attributes in the form of a single chart at the bottom and shows a message (The scores of the selected attributes for evaluation suggest that there may be room for improvement in your elbow.) at the top to indicate which of the three attributes has a large effect on the reference attribute.

The message in screen IMG32 is selected by CPU 610. CPU 610 compares the respective scores of the three attributes transmitted from CPU 910 to select the score with the lowest value and specifies the attribute associated with the selected score as the attribute having the largest effect on the reference attribute. The message in screen IMG32 is a message for giving a notice of the specified attribute. This message is an example of information evaluating the degree of relevancy to the attribute of the first kind in the attributes of the second kind. That is, it is information representing the attribute with the highest degree of relevancy to the attribute of the first kind, among two or more attributes of the second kind.

Specifying the attribute having the largest effect on the reference attribute may be executed by CPU 910.

The score of the highest value among the calculated scores may be specified as the attribute having the largest effect.

<9. Display for a Plurality of Competing Attributes>

When an attribute is assigned as an attribute of the first kind and a plurality of ("three" in the example in FIG. 18 and FIG. 19) attributes are assigned as attributes of the second kind, the evaluation information provision system may further display the attributes competing with the attribute assigned as an attribute of the first kind, as shown in FIG. 18 and FIG. 19.

Figure 20:
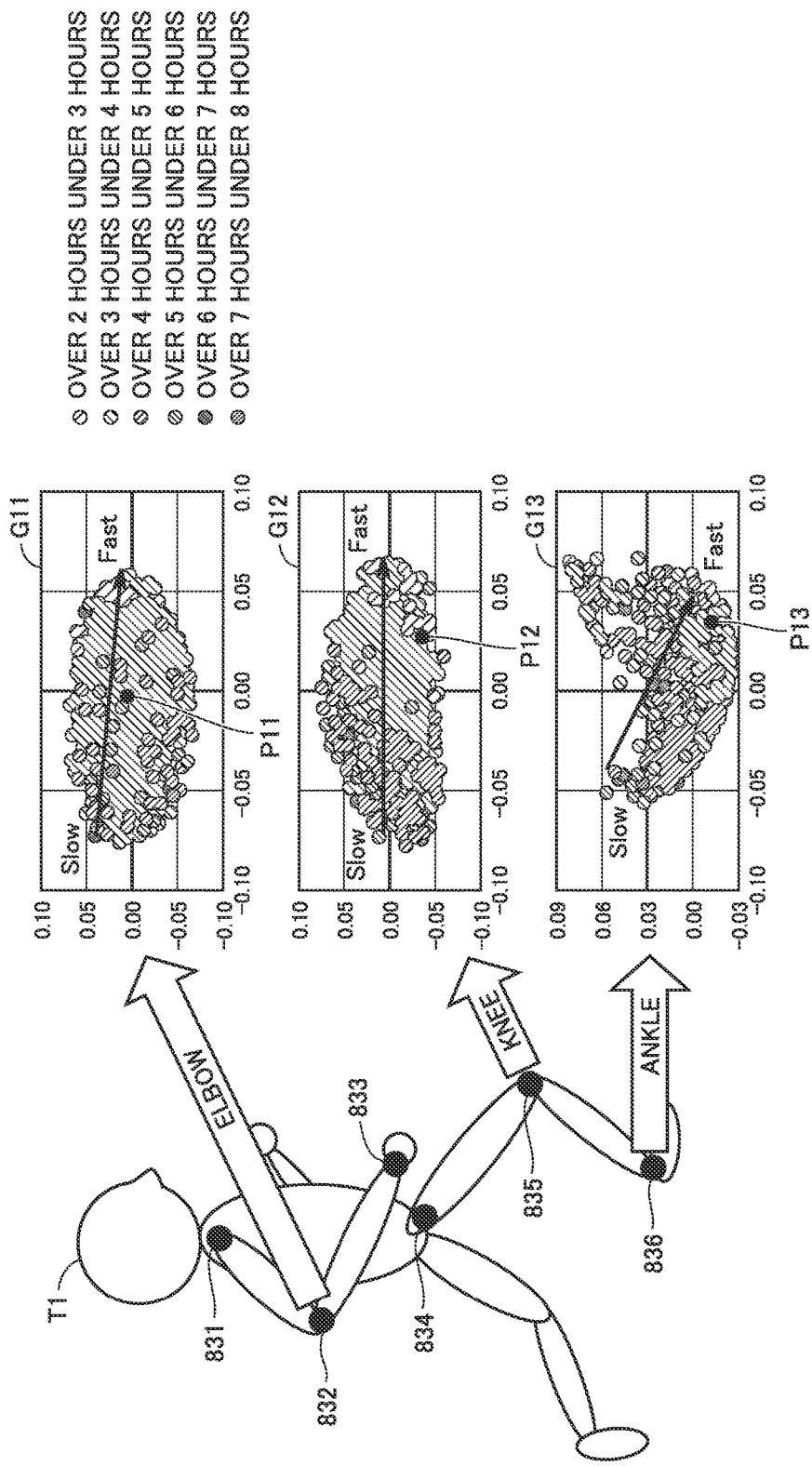
FIG. 20 is a diagram showing an example of the screen displaying the distances calculated for the subject's motion data belonging to a plurality of competing attributes, in manners different from each other.

FIG. 20 is a diagram showing an example of the screen displaying the distances calculated for subject's motion data belonging to a plurality of competing attributes, in manners different from each other.

In the example shown in FIG. 20, "running time over 2 hours under 3 hours" is selected as an attribute of the first kind, and "elbow (speed)", "knee (speed)", and "ankle (speed)" are assigned as attributes of the second kind, as in the example shown in FIG. 18 and FIG. 19. Five attributes (the running times over 3 hours under 4 hours, over 4 hours under 5 hours, over 5 hours under 6 hours, over 6 hours under 7 hours, and over 7 hours under 8 hours) are stored as attributes competing with the attribute of the first kind "running time over 2 hours under 3 hours" in memory 930 of Web server 900. Then, in the example shown in FIG. 20, CPU 910 calculates the distance from the feature data (the one selected from a plurality of among the motion data associated with the attribute "running time over 2 hours under 3 hours"), for the motion data belonging to each of the five attributes in addition to the motion data associated with the attribute "running time over 2 hours under 3 hours", for each of the attributes of the second kind. The calculated distance is then displayed using the multidimensional scaling method, as illustrated in graphs G11 to G13 in FIG. 20.

That is, for example, in each of graphs G11 to G13, the distance from the feature data is visualized for each of the subject's motion data with a running time over 2 hours under 3 hours, the subject's motion data over 3 hours under 4 hours, the subject's motion data over 4 hours under 5 hours, the subject's motion data over 5 hours under 6 hours, the subject's motion data over 6 hours under 7 hours, and the subject's motion data over 7 hours under 8 hours.

The thick lines in graphs G11 to G13 schematically show the tendency of data in graphs G11 to G13. In all of graphs G11 to G13, the estimated finish time tends to be reduced toward the right side. That is, the user can understand from graphs G11 to G13 that the second attribute (the acceleration of the elbow, the acceleration of the knee, the acceleration of the ankle) assigned for each of graphs G11 to G13 has a relevancy to the running time.

Furthermore, in each of graphs G11 to G13, points P11, P12, P13 are illustrated as points representing the user's motion data.

Figure 21:
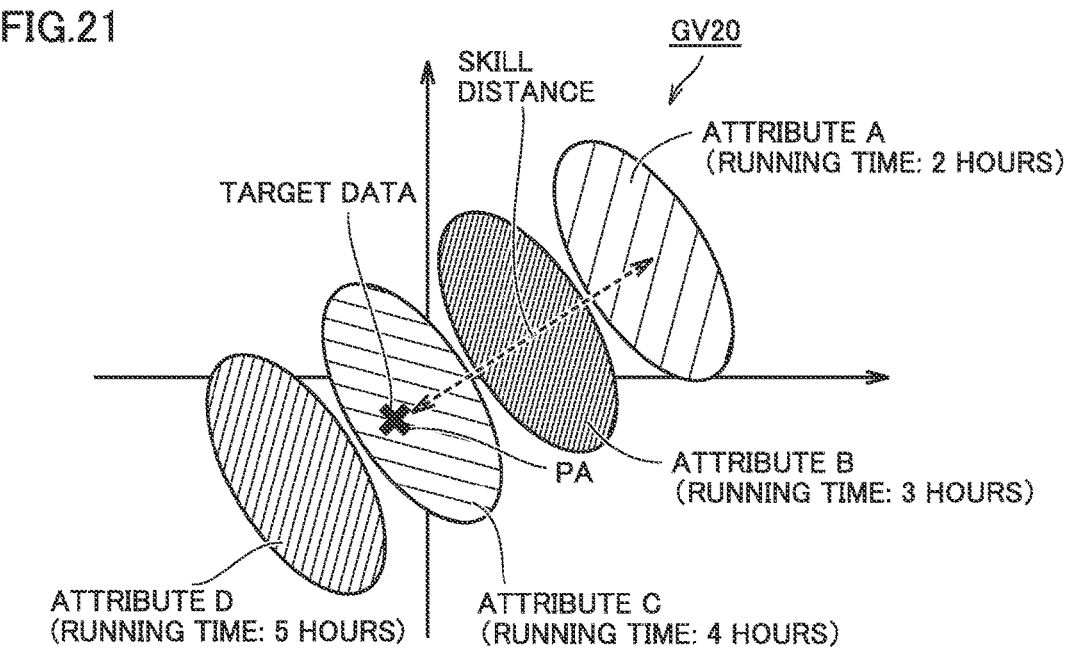
FIG. 21 is a diagram for explaining the tendencies shown in graphs G11 to G13 in FIG. 20 in a simplified form.

FIG. 21 is a diagram for explaining the tendency shown in each of graphs G11 to G13 in FIG. 20 in a simplified form.

Graph GV20 in FIG. 21 shows the attributes A to D as the attributes of the second kind and the attributes competing with it. More specifically, the distance of the motion data belonging to each of the attributes A to D from the feature data is shown by the multidimensional scaling method. The attributes A, B, C, and D represent the running time "2 hours", "3 hours", "4 hours", and "5 hours", respectively.

Attributes A to D are attributes competing with each other and different in the degree of superiority/inferiority of motion. For example, of attributes A to D, attribute A corresponds to the most superior motion, and the superiority/inferiority is specified in the order of attribute A, attribute B, attribute C, and attribute D. As shown in FIG. 21, it can be understood that when the tendency of the distance of motion data forms a group for each of the attributes A to D and the arrangement of groups represents the relation similar to the arrangement of superiority/inferiority, the attribute of the first kind has an effect on the superiority/inferiority of the attributes of the second kind.

Second Embodiment

In the evaluation information provision system in a second embodiment, information for evaluation is provided for the user's batting form instead of the user's running form.

<1. System Overview>

Figure 22:
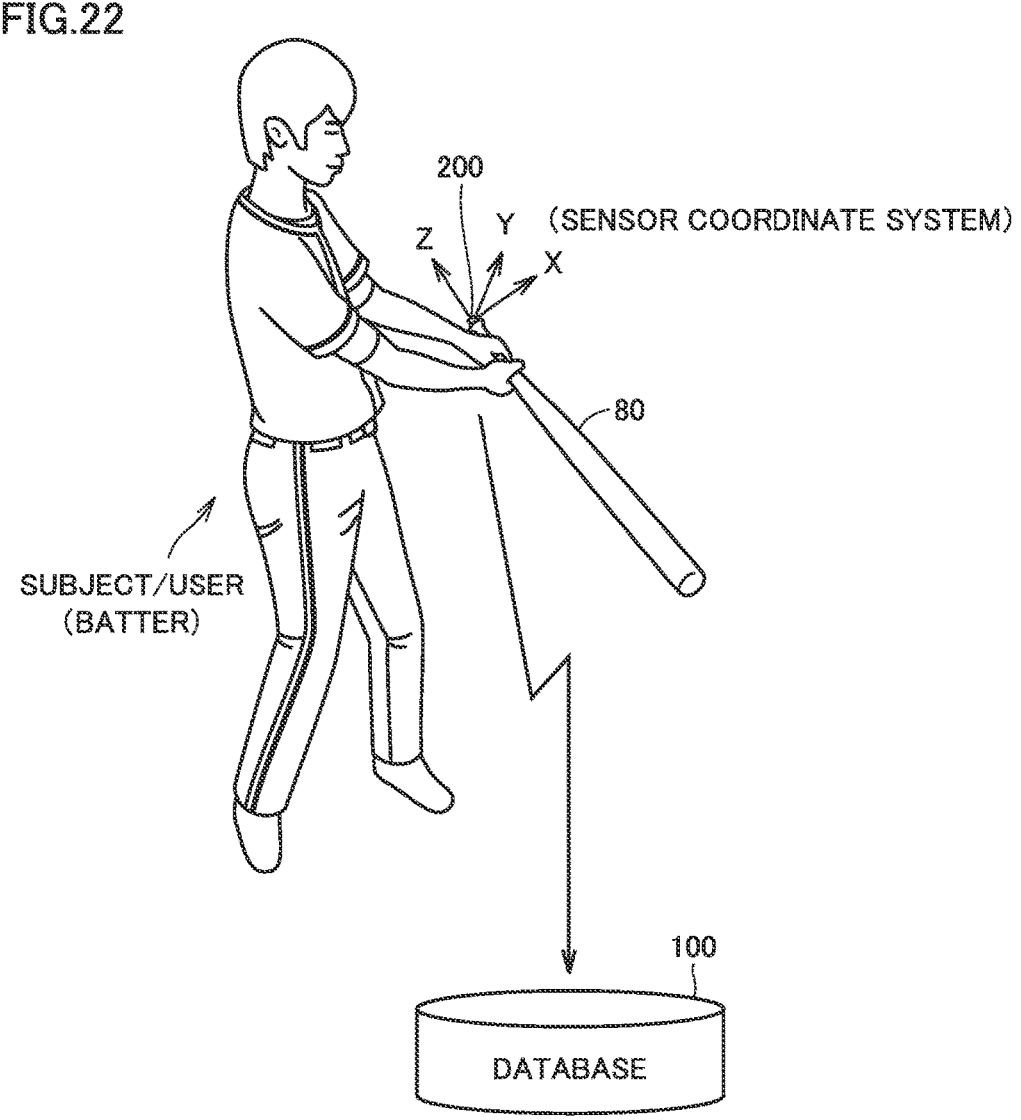
FIG. 22 is a diagram for explaining an input manner of motion data in the evaluation information provision system in a second embodiment.

FIG. 22 is a diagram for explaining an input manner of motion data in the evaluation information provision system in the second embodiment. As shown in FIG. 22, in the evaluation information provision system in the second embodiment, output of a sensor device 200 attached to a bat 80, which is an example of a tool used by a subject or a user in motion, is inputted as motion data to database 100. Sensor device 200 is, for example, an accelerometer that detects the acceleration for three axes orthogonal to each other (X-axis, Y-axis, Z-axis) and an gyro sensor that detects the angular velocity around the three axes (X-axis, Y-axis, Z-axis). Sensor device 200 may detect either one of the acceleration and the angular velocity. Sensor device 200 transmits the detected output to database 100 and Web server 900.

In the second embodiment, an example of the attribute associated with motion data is information indicating the category of a subject or a user (professional baseball player or amateur player). An example of the classification belonging to the attribute is information that specifies each player (for example, the player's name). Another example of the attribute is information indicating whether the subject or the user is a right-handed batter or a left-handed batter. Yet another example of the attribute is the material (wood or metal) of bat 80.

<2. Hardware Configuration of Sensor Device>

Figure 23:
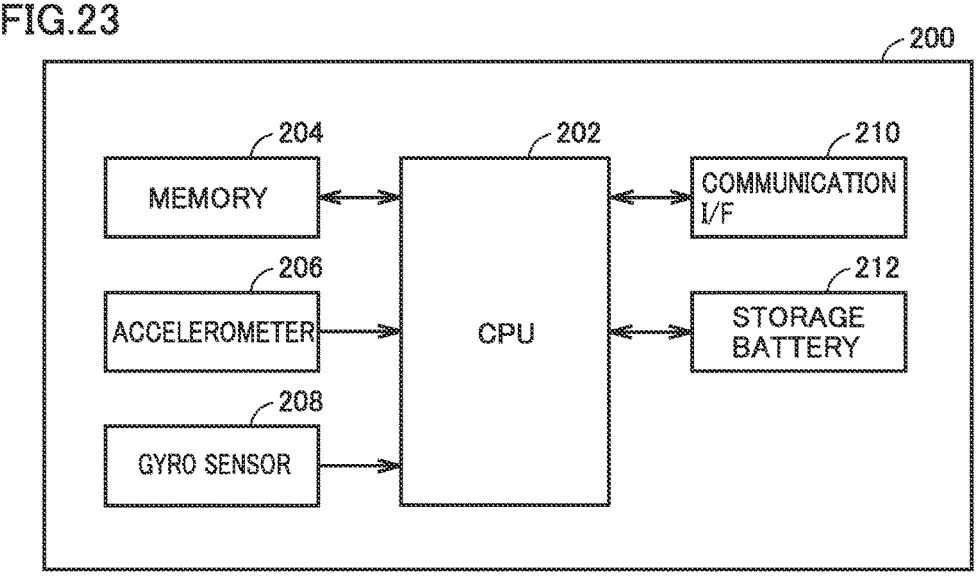
FIG. 23 is a block diagram showing a hardware configuration of a sensor device in the second embodiment.

FIG. 23 is a block diagram showing a hardware configuration of sensor device 200 in the second embodiment. As shown in FIG. 23, sensor device 200 includes, as main components, a CPU 202 for executing a variety of processing, a memory 204 for storing a program executed by CPU 202, data, and the like, an accelerometer 206 capable of detecting the acceleration in three axis directions, an gyro sensor 208 capable of detecting the angular velocity around each of three axes, a communication interface (I/F) 210 for communicating with database 100, and a storage battery 212 supplying electricity to various components in sensor device 200.

<3. Specific Example of Data>

Figure 24:
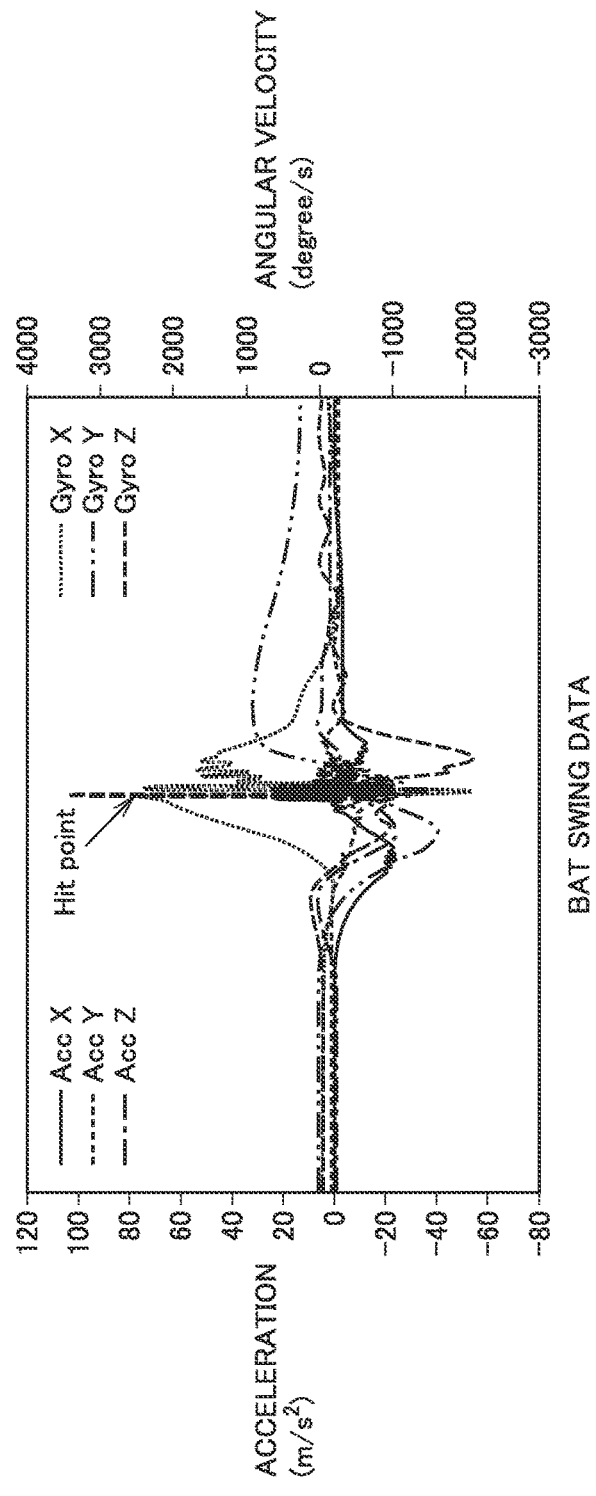
FIG. 24 is a diagram showing a specific example of detection output of the sensor device.

FIG. 24 is a diagram showing a specific example of detection output of sensor device 200. FIG. 24 shows the acceleration in the X-axis, the Y-axis, and the Z-axis ("AccX", "AccY", "AccZ" in FIG. 24) and the angular velocity for the X-axis, the Y-axis, and the Z-axis ("GyroX", "GyroY", "GyroZ" in FIG. 24).

As shown in FIG. 24, when the subject or the user swings bat 80 (FIG. 23), the value of each detection output changes about the hit point of the swing ("Hit point" in FIG. 24). That is, in the evaluation information provision system, all of the changes in detection output of the acceleration in the X-axis, the Y-axis, and the Z-axis and the angular velocity for the X-axis, the Y-axis, and the Z-axis reflect the motion of swing of bat 80.

<4. Display Example of Motion Data>

Also in the evaluation information provision system in the second embodiment, Web server 900 nonlinearly transforms motion data, then calculates the distance between motion data, and plots the distance by the multidimensional scaling method, in the same manner as in the first embodiment.

Figure 25:
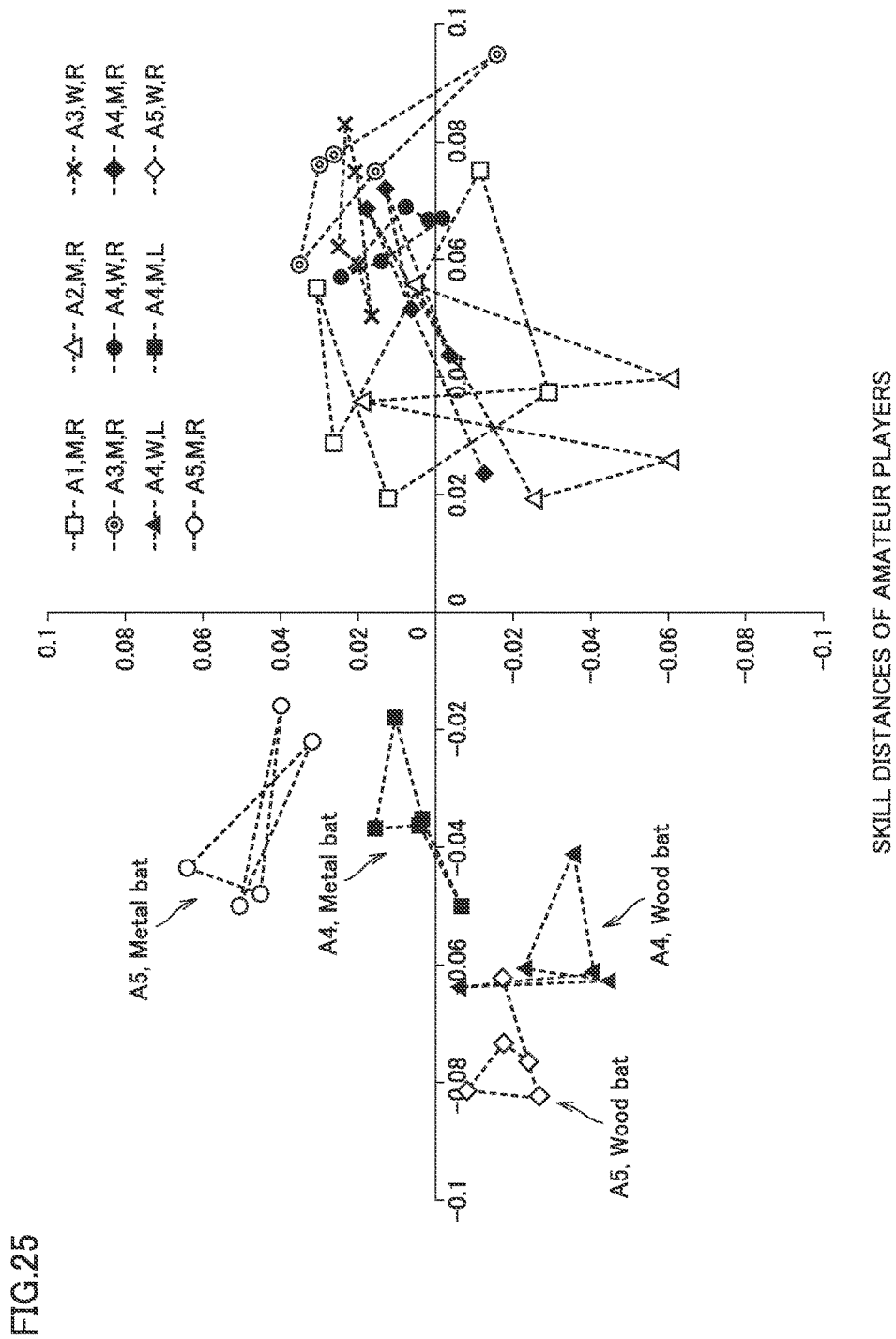
FIG. 25 shows an example of plots in the second embodiment.

FIG. 25 shows an example of plots in the second embodiment. FIG. 25 shows the distance for ten kinds of motion data for the attribute "amateur player". In FIG. 25, ten kinds of motion data are identified by signs such as "A1, M, R".

The sign in FIG. 25 is divided into three portions, such as "A1, M, R". The first portion "A1" specifies a subject or a user. "A" means the attribute "amateur".

The second portion "M" specifies the kind of bat 80. "M" means metal, and "W" means wood.

The third portion "R" specifies whether the swing is right-handed or left-handed. "R" means right-handed, and "L" means left-handed.

In the example shown in FIG. 25, the distances for a plurality of sets of motion data are visualized in the form of various kinds of data. Each distance shown in FIG. 25 corresponds to one swing. That is, in FIG. 25, the distance corresponding to each of a plurality of swings is visualized when a subject or a user takes a swing multiple times with the same combination of attributes.

In the display in FIG. 25, for the attribute "amateur", the distance for motion data is visualized in different manners (different kinds of plots such as □, ○) according to the classification "subject or user". Thus, according to the perspective that a user can compare the distributions among the the distances for the user's motion data and the distances for the subject's motion data, to minimize the skill distance against the user who acquires knowledge that which degree(s) affect(s) the user's motion (swing) of the targeted subject's motion (swing).

When the display in FIG. 25 is performed for each of the user's motion data at a plurality of times, the user can acquire knowledge as to whether the user's motion (swing) is coming close to or far away from the targeted subject's motion (swing) in a time line.

Figure 26:
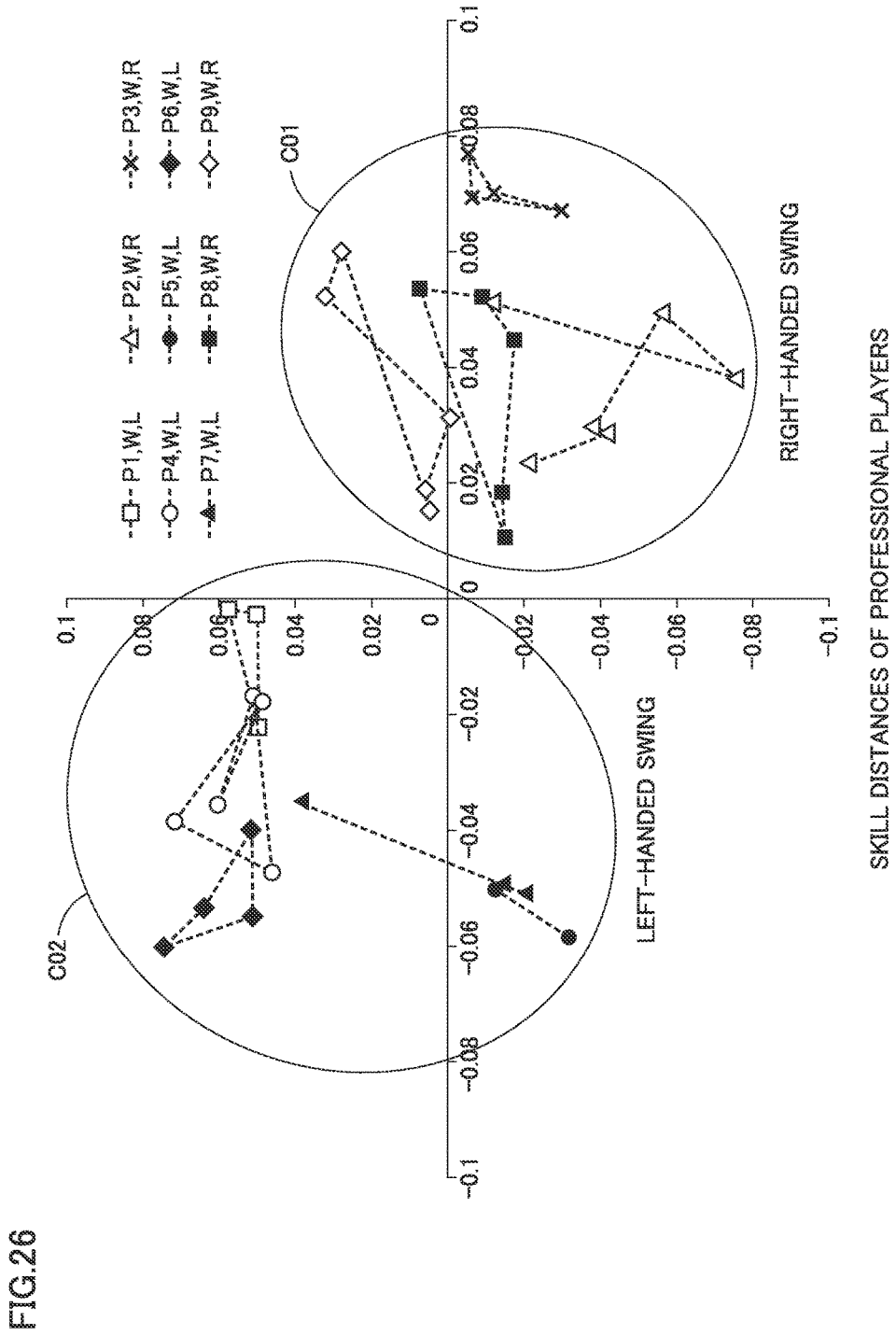
FIG. 26 shows another example of plots in the second embodiment.

FIG. 26 is another example of plots in the second embodiment. In FIG. 26, the distances for nine kinds of motion data for the attribute "professional player" are visualized. In FIG. 26, the nine kinds of motion data are identified by signs such as "P1, W, L" in the same manner as in FIG. 25.

The sign in FIG. 26 is divided into three portions in the same manner as the signs in FIG. 25. The first portion "P1" specifies a subject or a user. "P" means the attribute "professional". The second portion "W" specifies the kind of bat 80. The third portion "L" specifies whether the swing is right-handed or left-handed.

In the display in FIG. 26, the distances for motion data are visualized in different manners (different kinds of plots such as □, ○) according to the classification "subject or user" for the attribute "professional". In particular, the display in FIG. 26 has a tendency that is not observed in the display in FIG. 25, that is, the range of distribution of distances for the motion data is specified by whether the swing is right-handed or left-handed. In FIG. 26, the range in which right-handed swings are distributed is schematically denoted by a range C01. The range in which left-handed swings are distributed is schematically denoted by a range C02.

In the evaluation information provision system in the second embodiment, both of the display in FIG. 25 and the display in FIG. 26 appear on user terminal 600 to allow the user to acquire knowledge regarding the tendency that was not observed in the distribution of the amateur players but done in one of the professional players.

In the second embodiment, the user can designate a target player. In accordance with the designation, Web server 900 generates data that displays the distances for only two kinds of motion data, that is, data that displays only the distance for the user's motion data and the distance for the motion data of the player designated by the user, on user terminal 600, and transmits the generated data to user terminal 600. This allows the user to directly compare the tendency of the user's motion with the tendency of the designated player's motion.

Also in the second embodiment, CPU 910 of Web server 900 can accept assignment of one attribute as an attribute of the first kind and assignment of two or more attributes as attributes of the second kind. In response, CPU 910 can calculate and output the user's score for the attribute of the first kind, for each of the attributes of the second kind.

An example of the attribute of the first kind is "professional baseball player". Examples of the attributes of the second kind are "power hitter" and "contact hitter". In such an example, CPU 910 calculates the score for each of the attribute "power hitter" and the attribute "contact hitter". That is, CPU 910 selects feature data from a plurality of the motion data associated with the attribute "professional baseball player" and associated with the attribute "power hitter", among motion data stored in database 100. The statistical distance between the selected motion data and the feature data is then calculated, and the statistical distance between the user's motion data and the feature data is also calculated. Using these statistical distances, the user's score for the attribute "professional baseball player" and the attribute "power hitter" is calculated.

CPU 910 also calculates the user's score for the attribute "professional baseball player" and the attribute "contact hitter" in the same manner.

CPU 910 then transmits the two scores calculated for the user as described above to user terminal 600.

CPU 610 of user terminal 600 specifies the attribute associated with the highest score from the transmitted two scores. CPU 610 then displays the specified attribute as the attribute specified as the type of the user's swing.

Figure 27:
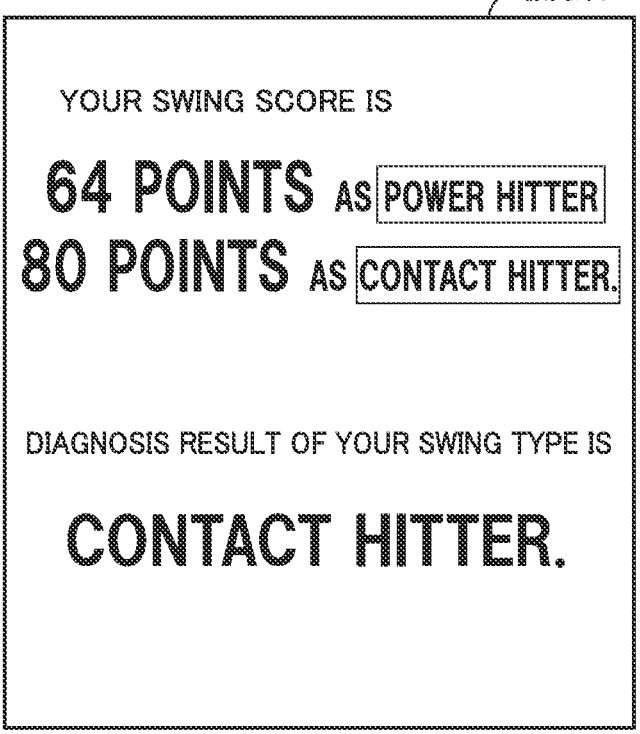
FIG. 27 is a diagram showing an example of display of the attribute specified as the user's swing type on the user terminal.

FIG. 27 is a diagram showing an example of the display of the attribute specified as the type of the user's swing on user terminal 600. Screen IMG41 in FIG. 27 displays the respective scores of the two attributes assigned as attributes of the second kind ("64 points" for the attribute "power hitter" and "80 points" for the attribute "contact hitter") as well as the attribute "contact hitter" specified as the type of the user's swing.

The embodiments and modifications disclosed here should be understood as being illustrative rather than being limitative in all respects. The scope of the present invention is shown not in the foregoing description but in the claims, and it is intended that all modifications that come within the meaning and range of equivalence to the claims are embraced here.

In the present disclosure, the provision of the score of the user's motion and information accompanying the score for a running form has been explained as the first embodiment. The provision of the score of the user's motion and information accompanying the score for a batting form has been described as the second embodiment. It should be noted that the motion targeted by the technique in the present disclosure is not limited thereto. The motion targeted by the technique in the present disclosure may include motions of sports other than those described above (for example, the user's motion in ski sliding) and motions other than those in sports (for example, the user's motion in walking training). That is, the technique in the present disclosure can use motion data acquired for every kind of motions to provide the score for the motion and information accompanying the score.

REFERENCE SIGNS LIST 100 database, 200 sensor device, 500 arithmetic processing unit, 600 user terminal, 610, 910 CPU, 800 running machine, 900 Web server.

The invention claimed is:

1. An evaluation information provision system for outputting information evaluating a motion of a user, using two or more sets of motion data of a subject stored in association with an attribute and motion data of the user, comprising:
   a gyro sensor, an acceleration sensor, or a camera configured to acquire motion data of a user;
   a processor configured to calculate a statistical distance between two or more sets of motion data and the motion data of the user; and
   an interface configured to acquire assignment of an attribute, wherein
   the processor is configured to calculate a score of the user for the attribute acquired by the interface,
   the interface is configured to output the score of the user calculated by the processor, and
   the processor is configured
      to select feature data representing a feature of the attribute acquired by the interface, based on the statistical distance calculated by the processor for motion data associated with the attribute acquired by the acquisition unit among the two or more sets of motion data, and
      to calculate the score of the user for the attribute acquired by the interface, using a statistical distance between the motion data associated with the attribute acquired by the interface and the feature data, and a statistical distance between the motion data of the user and the feature data.

2. The evaluation information provision system according to claim 1, wherein motion data represents each of motions of one or more parts of a subject or a user.

3. The evaluation information provision system according to claim 1, wherein motion data represents each of motions of one or more parts in a tool operated by a subject or a user.

4. The evaluation information provision system according to claim 1, wherein the interface is configured to accept input of assignment of an attribute.

5. The evaluation information provision system according to claim 1, wherein the attribute includes a classification for superiority/inferiority of a motion.

6. The evaluation information provision system according to claim 5, wherein the classification is a diversity of marathon running times.

7. The evaluation information provision system according to claim 1, wherein the attribute includes a classification for a property other than superiority/inferiority of a motion.

8. The evaluation information provision system according to claim 7, wherein the classification distinguishes a person who makes a motion or a tool used in a motion.

9. The evaluation information provision system according to claim 1, wherein the processor is configured to select motion data having a smallest mean value of statistical distances from other motion data, as the feature data, from a plurality of motion data associated with the attribute acquired by the interface.

10. The evaluation information provision system according to claim 1, wherein the processor is configured to set an order for the statistical distance from the feature data, in the motion data of the user and the motion data associated with the attribute acquired by the interface, and to calculate the score of the user based on the order in the user's motion data.

11. The evaluation information provision system according to claim 1, wherein
the processor is configured to calculate the score of the user for each of the motion data of the user at a plurality of timings, and
the interface is configured to output the score of the user for each of the plurality of timings.

12. The evaluation information provision system according to claim 11, wherein the interface is configured to further output information evaluating whether a change of scores at the plurality of timings rises or falls over time.

13. The evaluation information provision system according to claim 1, wherein the interface is configured to acquire assignment of different kinds of attributes.

14. The evaluation information provision system according to claim 13, wherein
the interface is configured to acquire assignment of an attribute of a first kind and an attribute of a second kind,
the attribute of the second kind includes two or more kinds of attributes,
the processor is configured to acquire feature data that is motion data representing a feature of the attribute of the first kind, for each kind of the attributes of the second kind, and to calculate the score of the user for the attribute of the first kind, for each kind of the attributes of the second kind, and
the interface is configured to output the score of the user for the attribute of the first kind, for each kind of the attributes of the second kind.

15. The evaluation information provision system according to claim 14, wherein the interface is configured to compare the scores for different kinds of the attributes of the second kind to output information evaluating the degree of relevancy to the attribute of the first kind in two or more kinds of attributes of the second kind.

16. The evaluation information provision system according to claim 14, wherein the interface is further configured to output a statistical distance calculated by the processor for motion data associated with an attribute to be compared with the attribute of the first kind, in a manner that identifies each of the attribute of the first kind and the attribute to be compared.

17. An evaluation information provision method executed by a processor to output information evaluating a motion of a user, using two or more sets of motion data of a subject stored in association with an attribute and motion data of the user, comprising:
collecting motion data of the user using a gyro sensor, an acceleration sensor, or a camera;
calculating a statistical distance between each of the two or more sets of motion data and the motion data of the user;
acquiring assignment of an attribute;
selecting feature data representing a feature of the acquired attribute from a plurality of motion data of the acquired attribute, based on a statistical distance calculated for motion data associated with the acquired attribute among the two or more sets of motion data, and calculating a score of the user for the acquired attribute, using a statistical distance between motion data associated with the acquired attribute and the feature data and a statistical distance between the motion data of the user and the feature data; and
outputting the calculated score of the user.

18. An evaluation information provision system for outputting information evaluating a motion of a user, using two or more sets of motion data of a subject stored in association with an attribute and motion data of the user, comprising:
a gyro sensor, an acceleration sensor, and a camera configured to acquire motion data of a user;
a processor configured to calculate a statistical distance between two or more sets of motion data and the motion data of the user; and
an interface configured to acquire assignment of an attribute, wherein
the processor is configured to calculate a score of the user for the attribute acquired by the interface,
the interface is configured to output the score of the user calculated by the processor, and
the processor is configured
to select feature data representing a feature of the attribute acquired by the interface, based on the statistical distance calculated by the processor for motion data associated with the attribute acquired by the acquisition unit among the two or more sets of motion data, and
to calculate the score of the user for the attribute acquired by the interface, using a statistical distance between the motion data associated with the attribute acquired by the interface and the feature data, and a statistical distance between the motion data of the user and the feature data.

* * * * *